United States Patent
Siomina et al.

(10) Patent No.: US 9,277,384 B2
(45) Date of Patent: Mar. 1, 2016

(54) METHODS AND APPARATUS FOR COMMUNICATING LOCATION INFORMATION FOR ENHANCING EMERGENCY POSITIONING

(75) Inventors: Iana Siomina, Solna (SE); Torbjörn Wigren, Uppsala (SE)

(73) Assignee: TELEFONAKTIEBOLAGET L M ERICSSON (PUBL), Stockholm (SE)

(*) Notice: Subject to any disclaimer, the term of this patent is extended or adjusted under 35 U.S.C. 154(b) by 98 days.

(21) Appl. No.: 13/995,439

(22) PCT Filed: Sep. 20, 2011

(86) PCT No.: PCT/IB2011/002503
§ 371 (c)(1),
(2), (4) Date: Sep. 5, 2013

(87) PCT Pub. No.: WO2012/080791
PCT Pub. Date: Jun. 21, 2012

(65) Prior Publication Data
US 2013/0337767 A1    Dec. 19, 2013

Related U.S. Application Data

(60) Provisional application No. 61/424,634, filed on Dec. 18, 2010.

(51) Int. Cl.
*H04W 4/22* (2009.01)
*G01S 5/00* (2006.01)
*G01S 5/02* (2010.01)

(52) U.S. Cl.
CPC .............. *H04W 4/22* (2013.01); *G01S 5/0009* (2013.01); *G01S 5/0205* (2013.01); *G01S 5/0289* (2013.01)

(58) Field of Classification Search
CPC ....................................................... H04W 4/22
USPC ............. 455/404.1–2, 414.2, 414.4, 456.1–5, 455/457–458, 11.1
See application file for complete search history.

(56) References Cited

U.S. PATENT DOCUMENTS

| 5,485,163 | A | 1/1996 | Singer et al. |
| 8,423,431 | B1* | 4/2013 | Rouaix et al. ................... 705/28 |

(Continued)

FOREIGN PATENT DOCUMENTS

| EP | 0 901 001 A2 | 3/1999 |
| EP | 2 228 626 A2 | 9/2010 |
| WO | 2009135103 A1 | 11/2009 |

OTHER PUBLICATIONS

Yang, et al. "Location-Aided Opportunistic Routing for Mobile Ad Hoc Networks" Wireless Communications, Networking and Mobile Computing, 2009, WICOM '09, 5th International Conference on, IEEE, 5 pages.
3rd Generation Partnership Project; Technical Specification Group Services and System Aspects; Universal Geographical Area Description (GAD) (Release 11), 3GPP TS 23.032 V11.0.0, 2012, 29 pages.
Wigren et al. "Emergency Call Delivery Standards Impair Cellular Positioning Accuracy" IEEE ICC 2010 Proceedings, 6 pages.
Siomina et al., U.S. Appl. No. 61/332,984, "Method for Using the Address Information for Positioning, Location and Location-Based Services" filed 2010, 32 pages.
W3C, "Scalable Vector Graphics (SVG) 1.1 (Second Efition)" W3C Recommendation, 2011, 826 pages.
American National Standard for Telecommunications, "Emergency calling service", T1.628-2000 (R2005), 2000, printed from http://www.doc88.com/p-381943573077.html.

*Primary Examiner* — Cong Tran
(74) *Attorney, Agent, or Firm* — Rothwell, Figg, Ernst & Manbeck, P.C.

(57) ABSTRACT

Methods and apparatus for handling positioning information by sending a positioning result, which can include uncertainty information, in at least one of a graphical format and a text-encoded graphical format. Positioning result accuracy, which can be important for emergency services, is improved by avoiding conversion between positioning result formats. Positioning results can be flexibly delivered, without concern for the particular radio access technology used in a communication network. The graphical format can be a vector graphics format, such as Scalable Vector Graphics and Wireless Vector Graphics. The text-encoded graphical format can be based on the extensible Markup Language, the positioning information in the graphical and/or text-encoded graphical format can be signaled by a messaging service.

27 Claims, 12 Drawing Sheets

(56) References Cited

U.S. PATENT DOCUMENTS

| | | | |
|---|---|---|---|
| 2006/0033615 A1* | 2/2006 | Nou | 340/539.13 |
| 2008/0174486 A1 | 7/2008 | Lee | |
| 2009/0067584 A1* | 3/2009 | Waters et al. | 379/45 |
| 2010/0003958 A1* | 1/2010 | Ray et al. | 455/404.2 |
| 2010/0082231 A1* | 4/2010 | Chang et al. | 701/201 |
| 2010/0085214 A1* | 4/2010 | Kim | 340/932.2 |
| 2010/0217518 A1* | 8/2010 | Chang et al. | 701/201 |
| 2011/0250906 A1 | 10/2011 | Siomina et al. | |

* cited by examiner

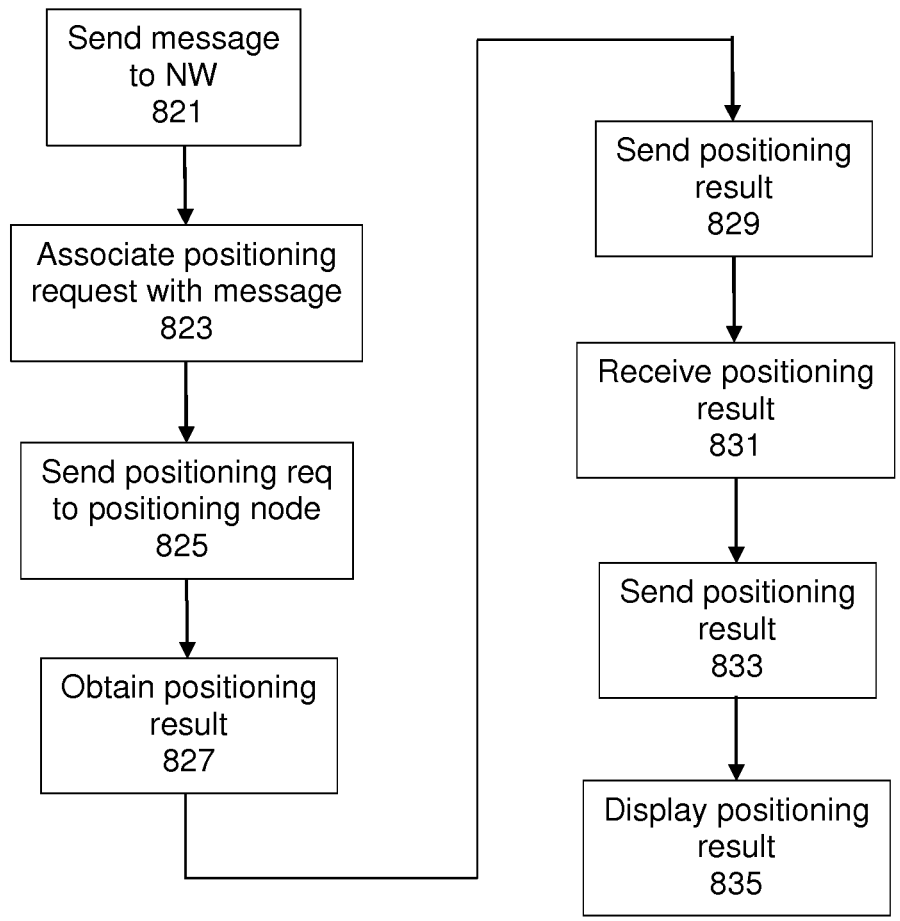
FIG. 8B
FIG. 11
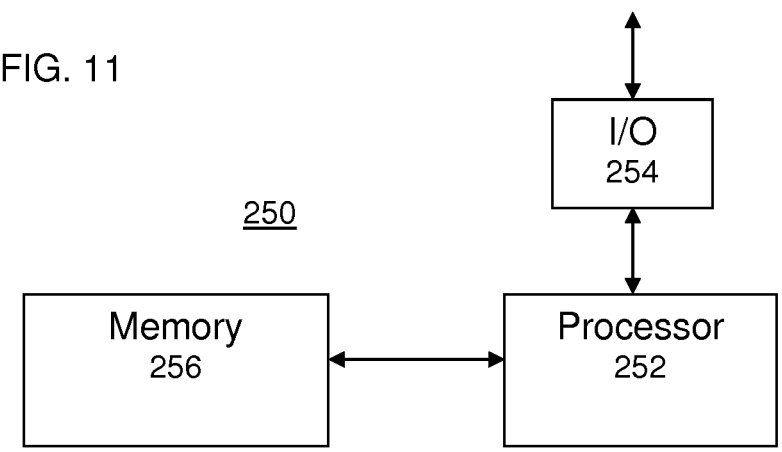

METHODS AND APPARATUS FOR COMMUNICATING LOCATION INFORMATION FOR ENHANCING EMERGENCY POSITIONING

CROSS REFERENCE TO RELATED APPLICATION(S)

This application is a 35 U.S.C. §371 National Phase Entry Application from PCT/IB2011/002503, filed Sep. 20, 2011, designating the United States, and also claims the benefit of U.S. Provisional Application No. 61/424,634, filed Dec. 18, 2010. The disclosures of both applications are incorporated herein in their entirety by reference.

TECHNICAL FIELD

This invention relates in general to positioning in communication networks and in particular to communicating position information between network nodes by non-voice communication.

BACKGROUND

Wireless device positioning is a process of determining a device's coordinates in space. Once the coordinates are determined, they can be mapped to a certain place or address. Mapping and delivery of positioning information on request are parts of a location service that can be required for many purposes, such as basic emergency services.

Emergency services based on non-voice communication, e.g., Short Message Service (SMS) messaging, is under discussion in the Third Generation Partnership Project (3GPP) and in North America at the regulatory level. Non-voice communication can make emergency services feasible for people with speech disabilities or in threatening situations when voice communication with Public Safety Answer Point (PSAP) agents is not possible.

Of course, different services can have different positioning accuracy requirements. For example, positioning accuracy requirements for basic emergency services are typically defined by government regulatory agencies, such as the United States Federal Communications Commission, which regulates in the area of telecommunications.

A number of problems have been identified with prior solutions to providing positioning results for emergency services and other purposes. For example, it may not be possible to transfer a positioning result directly to a network element (e.g., a PSAP) because the receiving element may not support the format of the positioning result as it is reported. In such cases, the positioning result has to be converted from the unsupported format to a format that is supported, which can introduce unacceptable position error.

In the United States for example, applicable emergency call reporting standards, such as American National Standard for Telecommunications, "Emergency calling service", T.1 628.2000 (R2005), and ANSI/J-STD-036-B, "Enhanced Wireless 9-1-1 Phase II" (May 2007), require the format of a positioning result delivered to PSAP equipment to be one of an ellipsoid point, an ellipsoid point with an uncertainty circle, and an ellipsoid point with an altitude and an uncertainty circle. Those three formats are only three of the seven formats used in communication networks specified by the 3GPP, and so the positioning result format conversion typically must be used for emergency services.

Shape conversion for positioning aims at transforming a positioning result from a given format (e.g., a Geographical Area Description (GAD) shape specified in 3GPP Technical Specification (TS) 23.032) to either a supported format (e.g., a format required by a PSAP) or a requested format at a required confidence level (e.g., typically 95% for a PSAP) such that the confidence of the transformed positioning result is at the required level. In practice, guaranteeing the same uncertainty at the same confidence before and after transformation is not possible in most of the cases, which is to say that the uncertainty of the transformed result is typically greater than that of the original result.

For example, an AECID positioning method described below typically delivers a positioning result and uncertainty in a polygon format, which must be converted to a circle covering the polygon in the best way before it is delivered to a PSAP or similar user. The AECID positioning result could be describing a long street between buildings, and so after format conversion, the positioning result could be transformed into a large circle covering both the street and the inside of the buildings.

Methods of transforming a positioning result from an ellipsoid arc format, an ellipsoid point with an uncertainty ellipse format, or an ellipsoid point with an altitude and uncertainty ellipsoid format to an ellipsoid point with an uncertainty circle format are described in T. Wigren et al., "Emergency Call Delivery Standards Impair Cellular Positioning Accuracy", IEEE ICC 2010, May 2010. The conversion methodology described there seeks to minimize the radius of the uncertainty circle, subject to the constraint that the original positioning shape (e.g., an ellipsoid arc) is covered by the uncertainty circle. Thus, a circle circumscribing the original positioning shape is to be found.

FIG. 1A depicts an example of the conversion methodology in Wigren et al., showing orthogonal distances from a radio base station (RBS) on the horizontal and vertical axes. In FIG. 1A, the position of the RBS is plotted as a star 101, and for a positioning ellipsoid arc 103, the center of the circumscribed uncertainty circle 105 is plotted as a point 107. The possibility of errors introduced by transforming a positioning result in the ellipsoid arc format to a positioning result in an ellipsoid point with an uncertainty circle format should be clear from FIG. 1A.

FIGS. 1B, 1C illustrate quantitative estimates of accuracy loss introduced by transforming a positioning result from one format to another. FIG. 1B is a plot of accuracy loss as a ratio of the areas of an uncertainty circle and a circumscribed ellipsoid arc with respect to distance from an RBS, for urban, suburban, and rural cells with radii of 500 m, 5 km, and 50 km, respectively. FIG. 1C is a plot of accuracy loss as a ratio of the areas of an uncertainty circle and a circumscribed ellipse with respect to a ratio of the semi-major and semi-minor axes of the ellipse. In both cases, the accuracy loss increases with the aspect ratio of the ellipse.

Moreover for different formats with different uncertainty information, different statistical models for describing positioning results within an area typically apply, e.g., a uniform distribution for polygons and ellipsoid arcs, but a two-dimensional (2-D) Gaussian probability distribution for uncertainty ellipses. Hence, even if the distributions could be taken into account when converting one format to another, the conversion would still cause information loss and introduce additional positioning errors.

Other problem areas that require positioning result format conversion include that currently it is not possible to send positioning results to a PSAP in native civic address formats and to signal the results directly from a PSAP to field agents (e.g., police officers and fire fighters). PSAPs typically do not dispatch emergency personnel to geographical coordinates but rather provide them with a street address. It is possible that a positioning result is already in a human-readable format, e.g., a civic address format, but the human-readable format may not be supported by the communication network, or the human-readable format may not be supported by the PSAP. Thus, transformation to an acceptable format and then back to a human-readable format is necessary for communicating the information to PSAP agents, introducing positioning errors.

Another problem area is that not all 3GPP positioning result formats include positioning uncertainty information. For example, a polygon format supported by 3GPP networks provides uncertainty information only implicitly, and so for such formats, there is no way to signal the positioning uncertainty information when necessary. Currently standardized positioning result formats, e.g., a polygon limited to fifteen vertices, can also be insufficient for hybrid positioning methods, which are expected to become important in 3GPP Long Term Evolution (LTE) communication networks. Hybrid positioning methods can yield positioning results that may be combinations of arcs, ellipses, polygons, etc. In most cases, such a result could not be represented by just one of any of the standardized GAD shapes. To comply with the standard, a polygon with more vertices representing more accurate positioning information could have to be converted to a polygon with the required fewer vertices, which in most cases means accuracy loss.

There is also currently no simple solution for communicating a positioning result, including uncertainty information, by device-to-device communication, e.g., mobilephone-to-mobilephone communication. Commercial examples where such communication would be useful include friend-finding and tracking the whereabouts of children, e.g., for safety reasons.

The Universal Mobile Telecommunication System (UMTS) is a third-generation (3G) mobile communication technology designed to succeed GSM. LTE is a UMTS successor that improves the UMTS in terms of higher data rates, improved efficiency, and lowered costs, among others. A Universal Terrestrial Radio Access Network (UTRAN) is the radio access network of a UMTS, and an Evolved UTRAN (E-UTRAN) is the radio access network (RAN) of an LTE system.

FIG. 2A depicts a communication network 200 with an E-UTRAN, in which a user equipment (UE) 210, such as a mobile telephone or other wireless communication device, is wirelessly connected to an RBS 220a, which in LTE is commonly called an evolved NodeB (eNodeB). The E-UTRAN shown in FIG. 2A has three eNodeBs 220a, 220b, 220c, each of which serves one or more areas, or cells, 230a, 230b, 230c, and is connected to a core network of the network 200. In an LTE network, the eNodeBs 220a-c are connected to a Mobility Management Entity (MME) 240 in the core network.

In this application, the UE 210 can be a mobile telephone; a pager; a headset; a tablet, netbook, or laptop computer; a small radio node or base station, such as for a home; a relay node; a sensor; etc., which as a device or node being positioned can also be called a Location Service (LCS) target.

Each eNodeB 220a, 220b, 220c serves a respective geographical area that is divided into one or more cells. An eNodeB can use one or more antennas at one or more sites to transmit information into its cell(s), and different antennas can transmit respective, different pilot, position reference, and other signals. Neighboring eNodeBs may be coupled to each other by an X2-protocol interface that supports active-mode mobility of the UEs. An eNodeB controls various radio network functions, including for example single-cell radio resource management (RRM), such as radio access bearer setup, handover, UE uplink/downlink scheduling, etc. Multi-cell RRM functions can also use the X2-protocol interfaces. Each eNodeB also carries out the Layer-1 functions of coding, decoding, modulating, demodulating, interleaving, de-interleaving, etc., and the Layer-2 retransmission mechanisms, such as hybrid automatic repeat request (HARQ).

In FIG. 2A, the MME 240 is connected to a positioning node 250, which can also be called a location server. The positioning node is a physical or logical entity that manages positioning for an LCS target, such as the UE 210. In a control-plane architecture, the positioning node 250 can be called an Evolved Serving Mobile Location Center (E-SMLC). As illustrated in FIG. 2A, the E-SMLC can be a separate core network node, but it can also be a functionality integrated in another network node. In a user-plane architecture, the positioning node 250 can be called a Secure User Plane Location (SUPL) Location Platform (SLP).

The LTE Positioning Protocol (LPP) and LTE Positioning Protocol annex (LPPa) are protocols used for carrying out positioning in the control-plane architecture in LTE. The LPP is also used in the user-plane architecture, and the LPPa can be used to support user-plane positioning. There can also be LPP extensions, e.g., LPPe, which can be included in LPP messages. Upon receiving a positioning request, the E-SMLC can receive positioning-related parameters from an eNodeB via the LPPa. The E-SMLC then assembles and sends assistance data and the request for the positioning or positioning measurements to the target wireless device, e.g., a UE, via the LPP.

FIG. 2B depicts an example of a control-plane architecture and protocols and FIG. 2C depicts an example of a user-plane architecture and protocols of a positioning system in an LTE network 200. In the control plane, a UE communicates with the E-SMLC 250 transparently via an eNodeB and an MME over the LPP, and the eNodeB communicates with the E-SMLC transparently via the MME over the LPPa. In the user plane, the LPPa protocol is not used, although the 3GPP allows for the possibility of inter-working between the control- and user-plane positioning architectures. There may or may not be an interface between the E-SMLC and the SLP. In the user-plane positioning architecture, the SUPL service, which is a lower layer for the LPP, uses established data-bearing channels (i.e., the LTE user plane) and positioning protocols (i.e., LPP) for exchanging positioning information between a LCS target (e.g., a UE) and a LCS server (e.g., a SLP). In the user-plane architecture, the UE 210 can be more precisely called a SUPL-enabled terminal (SET).

Thus, the LPP is a point-to-point protocol between an LCS server, such as the E-SMLC, and an LCS target, such as the UE, that is used to position the target. Transmitted LPP messages are transparent to the MME, and use radio resource control (RRC) protocol messages for transport over an LTE-Uu interface between the UE and the eNodeB, and then S1 application protocol (S1AP) messages over an S1-MME interface between the eNodeB and the MME, and then LCS-AP messages over an SLs interface between the MME and the E-SMLC. LPP is defined in 3GPP TS 36.355 V9.2.1, LTE Positioning Protocol (LPP) (Release 9) (June 2010), for example.

The LPPa is a protocol for the interface between an eNodeB and the positioning node, such as the E-SMLC. LPPa messages are also transparent to the MME, which routes LPPa message packets over the S1-MME and SLs interfaces without knowledge of the involved LPPa transactions. The eNodeB may also be unaware of the information carried by an LPPa message or the corresponding UE, although the eNodeB may be aware of the fact that there is a transaction as the message can be received and forwarded. With interworking between the control and user planes, LPPa can assist the user plane by querying eNodeBs for information and eNodeB measurements not related to a UE connection. LPPa is defined in 3GPP TS 36.455 V9.2.0, LTE Positioning Protocol A (LPPa) (Release 9) (June 2010), for example.

Positioning Methods and Positioning Results

An LTE network can implement a variety of complementary positioning methods that have different performances in different environments. Depending on where positioning measurements are made and the final positioning result that is calculated, the methods can be UE-based, UE-assisted, or network-based, and each has its own advantages.

In some environments, a positioning result can be accurately determined by using positioning methods based on a Global Positioning System (GPS). Nowadays, networks often are also able to assist a UE in order to improve the device's receiver sensitivity and GPS start-up performance, as in, for example an Assisted-GPS (A-GPS) positioning method. Another terrestrial positioning method, called Observed Time Difference of Arrival (OTDOA), has been standardized by the 3GPP to remedy some of the problems with GPS and A-GPS.

In addition to UE-assisted OTDOA, the 3GPP LTE network specifications also define methods, procedures, and signaling support for Cell Identity (CID); UE-assisted and network-based Enhanced CID (E-CID); and UE-based and UE-assisted Assisted-Global Navigation Satellite System (A-GNSS), including A-GPS. Uplink Time Difference of Arrival (UTDOA) is also under consideration for LTE networks.

CID Positioning

Given the cell ID of a UE's serving cell, the UE position corresponds to the cell coverage area, which can be described, for example, by a pre-stored polygon, where the cell boundary is modeled by a set of non-intersecting polygon segments connecting all the corners.

E-CID Positioning

E-CID positioning exploits four sources of positioning information: the CID and the corresponding geographical description of the serving cell, the round trip time (RTT) with respect to the serving cell (measured, for example, by a timing advance (TA) of the serving cell and/or receive-transmit (Rx-Tx) time difference measured at either the UE or the RBS), the CIDs and corresponding signal measurements of other cells (up to 32 cells in LTE, including the serving cell), as well as network-based angle of arrival (AoA) measurements.

UE received-signal measurements that can be utilized for E-CID in LTE include carrier Received Signal Strength Indicator (RSSI), Reference Signal Received Power (RSRP), Reference Signal Received Quality (RSRQ), and UE receive-transmit (Rx-Tx) time difference. The E-UTRAN measurements available for E-CID are eNodeB Rx-Tx time difference, TA Type 1 corresponding to (eNodeB Rx-Tx time difference)+(UE Rx-Tx time difference), TA Type 2 corresponding to eNodeB Rx-Tx time difference, and uplink (UL) AoA. UE Rx-Tx measurements are typically used for the serving cell, and for example RSRP and RSRQ as well as AoA can be utilized for any cell and can also be conducted on a frequency different from that of the serving cell. UE E-CID measurements are reported by the UE to the positioning server over the LPP, and the E-UTRAN E-CID measurements are reported by the eNodeB to the positioning node over the LPPa.

Three common E-CID positioning methods include: CID+RTT, CID+signal strength, and AoA+RTT. Measurements from multiple cells can also be used with E-CID. The positioning result of CID+RTT includes a positioning shape that is typically an ellipsoid arc describing the intersection of the cell polygon and a circle corresponding to the RTT. A typical result of the signal-strength based E-CID positioning includes a positioning shape that is a polygon since the signal strength is subject to fading effects, for example, and therefore often does not scale exactly with the distance. A typical positioning shape of AoA+RTT positioning is an ellipsoid arc describing the intersection of a sector limited by AoA measurements and a circle from the RTT-like measurements.

OTDOA Positioning

With OTDOA, an LCS target such as a UE measures timing differences for downlink reference signals received from multiple distinct locations. For each measured neighbor cell, the UE measures Reference Signal Time Difference (RSTD) which is the relative timing difference between a neighbor cell and the reference cell. The UE positioning result is then found as the intersection of hyperbolas corresponding to the measured RSTDs. At least three measurements from geographically separated RBSs with a good geometry are needed to solve for two coordinates of the UE. In order to find the UE position, knowledge of RBS locations and transmit timing offsets is needed. The positioning calculations can be conducted, for example, by the positioning node, such as the E-SMLC or the SLP in LTE, or by the UE. The former approach corresponds to UE-assisted positioning, and the latter corresponds to UE-based positioning.

In UTRAN Frequency Division Duplex (FDD), system frame number (SFN) measurements can be used for positioning. In particular, an SFN-SFN type 2 measurement performed by the UE can be used for OTDOA positioning. That measurement is the relative timing difference between cells based on the primary Common Pilot Channel (CPICH) transmitted by the cells. The UE-reported SFN-SFN type 2 can be used by the network to determine the UE position.

Other Positioning

Hybrid positioning, fingerprinting positioning, and assisted E-CID (AECID) do not require additional standardization by 3GPP and are therefore also possible in an LTE network. Furthermore, there can also be UE-based versions of the methods described above, e.g., UE-based GNSS (e.g., GPS) or UE-based OTDOA, etc. There can also be alternative positioning methods, such as civic-address-based positioning, which is described in U.S. patent application Ser. No. 12/871,984 filed on Aug. 31, 2010, although it can be noted that messaging supporting civic-address-based positioning is not yet standardized by 3GPP.

In fingerprinting and AECID positioning, the typical format of a positioning result is a polygon because both methods typically involve received signal measurements, CID, etc. In TDOA-based and TOA-based methods (e.g., OTDOA, UTDOA, and GNSS/A-GNSS), a typical format of the positioning result is an ellipsoid point with uncertainty circle/ellipse/ellipsoid, which is the result of intersection of multiple hyperbolas/hyperbolic arcs (e.g., OTDOA) or circles/arcs (e.g., UTDOA, GNSS, and A-GNSS).

A hybrid positioning method is any combination of the positioning methods described above, and so the positioning result can typically have any shape or format. Nevertheless, the positioning result of a hybrid positioning method in many cases is likely to have a polygon as the positioning shape.

It will be appreciated that other networks, e.g., UMTS, GSM, and cdma2000 networks, also typically support a variety of positioning methods that are equivalent to those described above.

Positioning Result Formats

Table 1 shows the positioning result formats that are included in the 3GPP network specifications. Each format is associated with a GAD shape, such as one of the seven GAD shapes specified in 3GPP TS 23.032, for example, Section 5 of 3GPP TS 23.032 V8.0.0, Universal Geographical Area Description (GAD) (Release 8) (December 2008). The shapes/formats in Table 1 apply for LTE, UMTS, and GSM networks, and equivalent formats can be used in other networks.

TABLE 1

Positioning result reporting formats in 3GPP

| Positioning result format | Description | Includes uncertainty | Includes confidence |
|---|---|---|---|
| Polygon | The polygon format is described by a list of 3-15 latitude, longitude corners, encoded in WGS 84 co-ordinates. This format may be obtained by application of cell ID positioning in LTE. | Yes* | No |
| Ellipsoid arc | The ellipsoid arc is described by a center point (eNodeB antenna position), encoded as latitude, longitude in WGS 84 co-ordinates. Furthermore, the format contains an inner radius of the arc, a thickness of the arc as well as the offset angle (clockwise from north) and the included angle (opening angle). Together, these parameters define a circular sector, with a thickness and with left and right angles. This format is e.g. produced by cell ID + TA positioning in LTE. | Yes | Yes |
| Ellipsoid point | The ellipsoid point format is described by a center point, encoded as latitude, longitude in WGS 84 co-ordinates. | No | No |
| Ellipsoid point with uncertainty circle | The ellipsoid point with uncertainty circle format consists of a center point, encoded as latitude, longitude in WGS 84 co-ordinates, in combination with an encoded radial uncertainty radius. | Yes | No |
| Ellipsoid point with uncertainty ellipse | The ellipsoid point with uncertainty ellipse format consists of a center point, encoded as latitude, longitude in WGS 84 co-ordinates. The uncertainty ellipse is encoded as a semi-major axis, a semi-minor axis and an angle relative to north, counted clockwise from the semi-major axis. This format is typically produced by OTDOA and A-GPS positioning in LTE. | Yes | Yes |
| Ellipsoid point with altitude | The ellipsoid point with altitude format is encoded as an ellipsoid point, together with an encoded altitude. | No | No |
| Ellipsoid point with altitude and uncertainty ellipsoid | This is the format commonly received from A-GPS capable terminals. It consists of an ellipsoid point with altitude and an uncertainty ellipsoid, the latter encoded with a semi-major axis, a semi-minor axis, an angle relative to north, counted clockwise from the semi-major axis, together with an uncertainty altitude. This format is typically produced by A-GPS positioning in LTE. | Yes | Yes |

*uncertainty information for polygon format is included implicitly, but not explicitly, as with the arc, for example, where there are two radii, and hence it is not clear whether the polygon is large due to a large uncertainty or the positioning result itself gives a large polygon The civic address format described above organizes civic address information identifying the physical geographical location of a network node, described with at least some of the conventional fields such as street, city, postal code, etc. An example of a civic address format is depicted in the following Table 2, where in practice each field typically is also associated with a short name or label. Other formats of representing the address information can, of course, be used. For multi-network compatibility, the address message format in 3GPP or 3GPP2 can also follow, for example, the format defined by IETF, or have a conversion interface to it.

TABLE 2

Civic Address Information Format

| Field Description | Field Type | Field Presence (optional/mandatory) | Default value |
|---|---|---|---|
| Apartment/office/suite number/floor number | 16 alpha/numeric | Optional | No data |
| Street number | 16 alpha/numeric | Optional | No data |
| Street name | 32 alpha/numeric | Optional | No data |
| City name | 32 alpha/numeric | Optional | No data |
| State/province name | 32 alpha/numeric | Optional | No data |
| Postal code | 16 alpha/numeric | Optional | No data |
| Road | 8 alpha/numeric | Optional | No data |
| Comment (for example: "northeast corner outside Main conference room") | 64 alpha/numeric | Optional | No data |

In Table 2, at least some of the Information Elements (IEs) defining the civic address format are hierarchical, with "lower" levels of hierarchy defining location with greater specificity, and "higher" levels of hierarchy defining location more generally, or with greater uncertainty. For example, a city is a more specific location than a state; a street name is more specific than a city; a street number with the street name is more specific still; etc. In this sense, the hierarchical level of an IE in the civic address format inherently carries uncertainty information. A positioning request can be tailored to a specific level of accuracy by specifying the IEs, or the highest hierarchical level IE, to be provided. This allows applications to tailor positioning requests to the level of accuracy desired, and reduces unnecessary signalling since the full civic address (i.e., any hierarchical level higher than that requested) need not be transmitted, or propagated through the network.

Similar to other positioning result formats, the positioning information in a civic address format can be complemented with at least one of the uncertainty and the confidence information, where in one embodiment the uncertainty information can be represented by a polygon format (e.g., one of the GAD shapes).

SUMMARY

Problems and drawbacks of previous techniques for providing positioning results can be avoided with methods and apparatus in accordance with this invention, which enhance communication of positioning information by sending a positioning result, which can include uncertainty information, in a graphical format. Thus, positioning result accuracy is improved by avoiding conversion between positioning result formats. Improved accuracy can be important for providing emergency services, which may accept only a limited number of positioning result formats. In addition, positioning results can be flexibly delivered, without concern for the particular radio access technology used in a communication network.

Embodiments of this invention include but are not limited to methods and apparatus for the following:

using a graphical format to signal positioning information, which can include uncertainty information, where the graphical format can be a vector graphics format (e.g., SVG and WVG) and where the positioning information in the graphical format can be signaled by a messaging service (e.g., SMS, EMS, MMS, any text-based message, etc.);

using positioning information signaled in a graphical format for delivering the information to PSAP agents;

using a messaging service to communicate a hidden positioning request, and providing responsive positioning information, where the hidden positioning request can be associated with a non-voice based emergency service;

using positioning information signaled in a graphical format in device-to-device communication; and enabling a positioning service to communicate positioning information by cell broadcast or multicast messaging over part or all of a cell area, where the communicated positioning information is in a graphical format and/or in a civic address format.

In accordance with aspects of this invention, there is provided a method in a first node in a communication network of handling positioning information. The method includes obtaining positioning information from a second node in the communication network; transforming the positioning information into at least one of a graphical format and a text-encoded graphical format; and sending a message including transformed positioning information to a third node in the communication network.

Also in accordance with aspects of this invention, there is provided a first node in a communication network for handling positioning information. The node includes at least one electronic processor circuit configured for obtaining positioning information from a second node in the communication network; transforming the positioning information into at least one of a graphical format and a text-encoded graphical format; and causing the node to send a message including transformed positioning information to a third node in the communication network.

BRIEF DESCRIPTION OF THE DRAWINGS

The various objects, features, and advantages of this invention will be apparent by reading this description in conjunction with the drawings, in which:

FIGS. 8A, 8B are flowcharts of example methods of handling positioning information in accordance with aspects of this invention;

FIG. 11 is a block diagram of a positioning node for handling positioning information in a communication network.

DETAILED DESCRIPTION

Figure 1A:
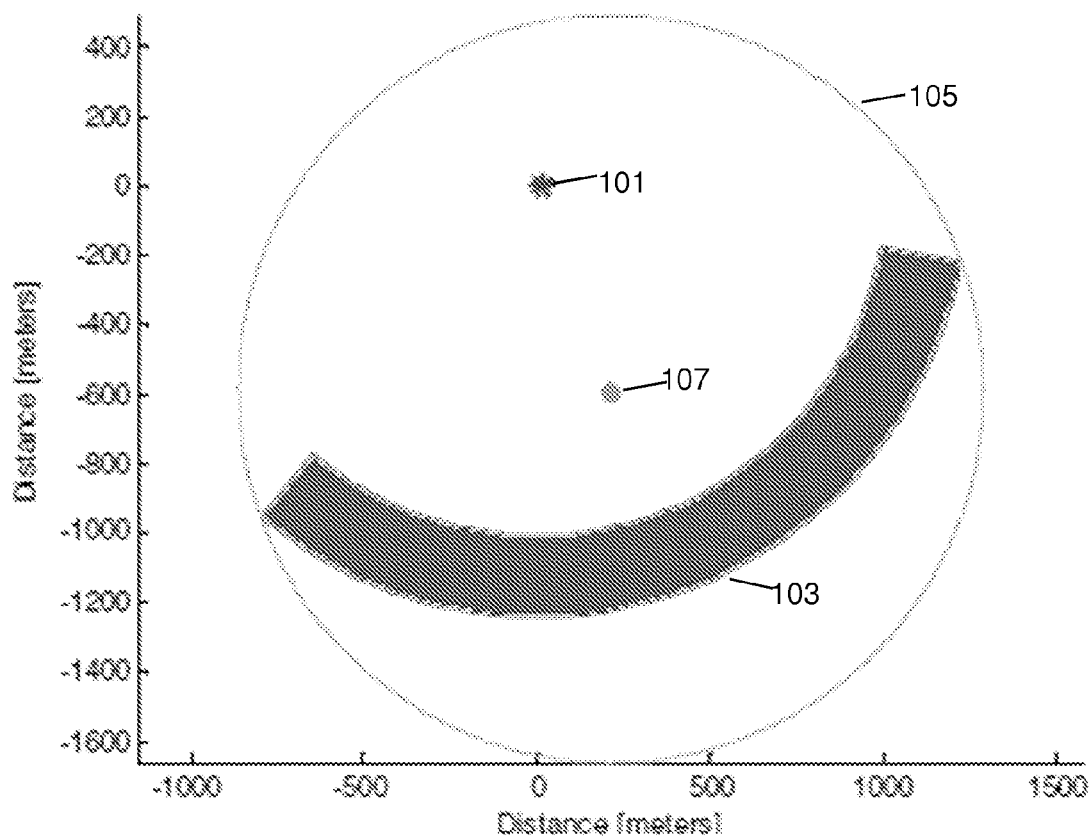
FIG. 1A depicts an example of a positioning format conversion methodology.
Figure 1B:
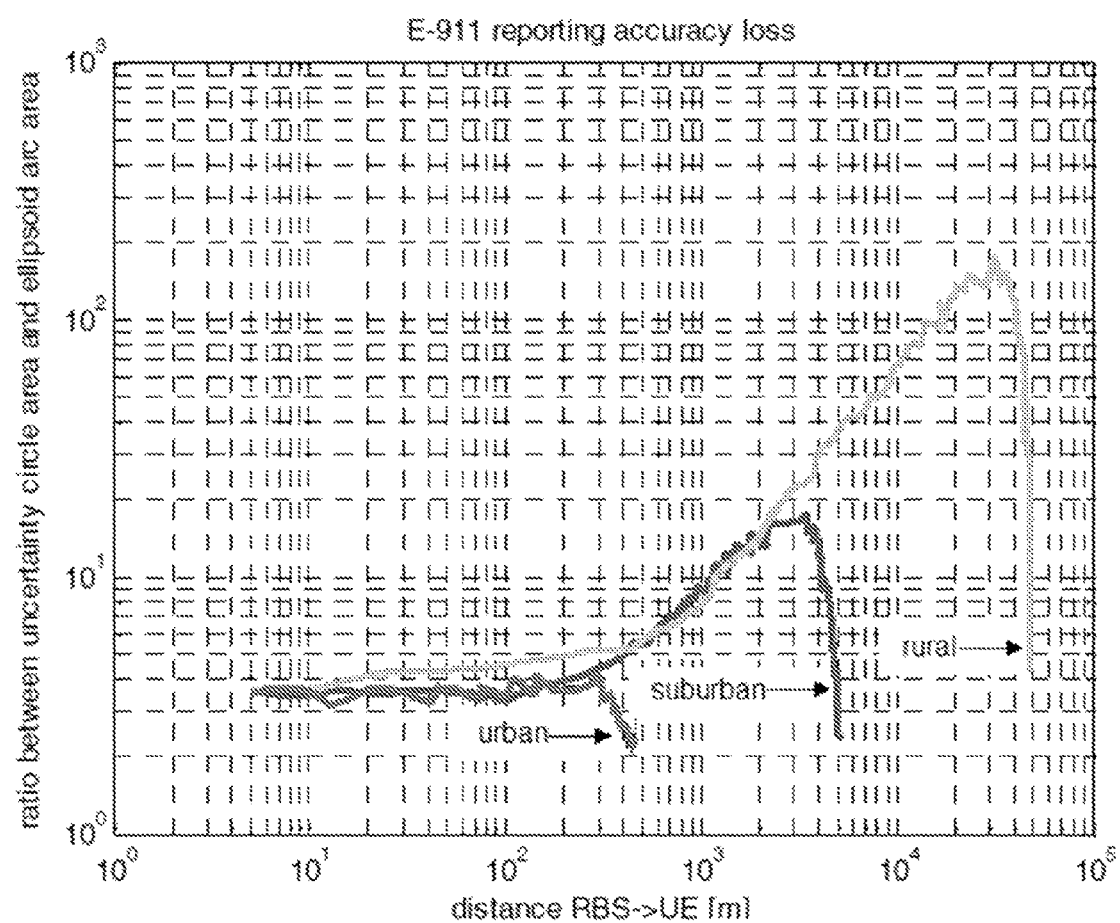
FIGS. 1B, 1C illustrate quantitative estimates of accuracy loss due to positioning format conversions.
Figure 1C:
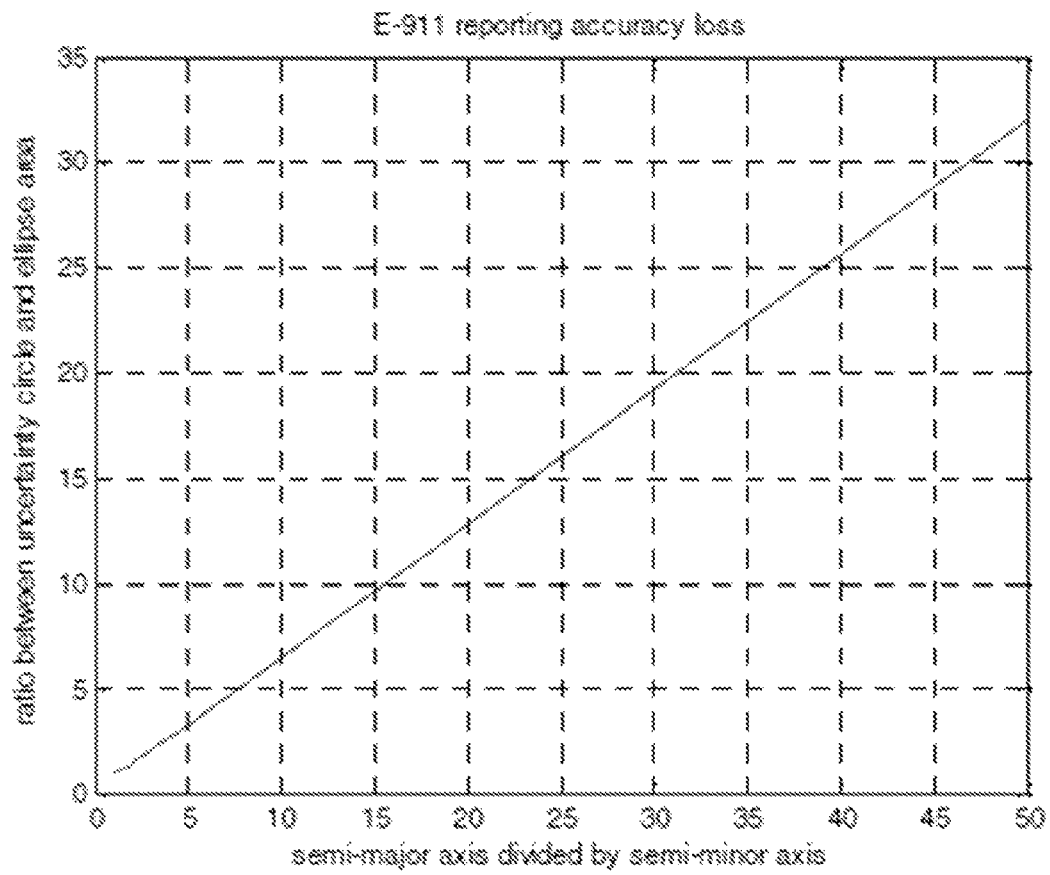

This application discloses methods and apparatus for at least (1) using a graphical format or a text-encoded graphical format to signal positioning information, which can include uncertainty information and which can be complemented by a reference position; (2) using positioning information signaled in a graphical format or a text-encoded graphical format for delivering the information to PSAP agents; (3) using a messaging service to communicate a hidden positioning request and providing positioning information responsive to the hidden request, which can be associated with a non-voice based emergency service; (4) using positioning information signaled in a graphical format or text-encoded graphical format in device-to-device communication; and (5) enabling a positioning service by cell broadcast or multicast messaging for communicating positioning information over part or all of the area of a cell, where the positioning information is communicated in a graphical format and/or a text-encoded graphical format and/or in a civic address format.

The graphical format can be a vector graphics format (e.g., Scalable Vector Graphics (SVG), Wireless Vector Graphics (WVG), etc.), and the graphics can be embedded in a text message (e.g., Enhanced Message Service (EMS) and Multimedia Messaging Service (MMS) messages) or can be text-encoded. Using text-embedded graphics enables communicating information in any graphical format within a text message. The text-encoded graphical format can be SVG, WVG, eXtensible Markup Language (XML), etc. A text-encoded graphical format enables positioning information in a graphical format to be signaled in a text message (e.g., Short Message Service (SMS) messages, EMS messages, etc.). As described below, EMS is an extension of SMS, and EMS messages can include special text formatting, animations, pictures, icons, sounds, etc. This description is mainly in terms of SMS and EMS, but it will be understood that this invention is not limited to these messaging services but can be embodied with any other message, e.g., MMS messages, any text-based messages, etc. In addition, this invention is not limited to LTE, but can be embodied in any radio access network (RAN), whether using a single radio access technology (RAT) or multiple RATs, such as LTE-Advanced, UMTS, GSM, cdma2000, WiMAX, and WiFi. Thus, limitations of standard positioning information reporting formats can be avoided, positioning accuracy can be improved, and positioning information can be flexibly delivered.

In this application, communication between two nodes or devices, such as UEs, RBSs, eNodeBs, and any other radio node, and any network node in general, such as a positioning node, PSAP, minimization of drive tests (MDT) node, and messaging node (e.g., an SMS gateway) means either communication via a direct link or indirectly via a logical link, e.g., involving one or more intermediate nodes or devices. A PSAP node in this application can but need not be the same PSAP used for voice-based emergency service. In at least one embodiment, the PSAP node used for non-voice based emergency service is different from that used for the voice-based emergency communication. A positioning node that is described in different embodiments can be understood, unless explicitly stated, as a positioning platform in a user plane or a positioning node in a control plane.

SMS Messaging

SMS was first introduced in 1985 into the 3GPP specifications of GSM communication networks for sending messages of up to 160 text characters (including spaces) to and from GSM mobile handsets. Since then, text messaging service was included in other communication networks, including Code Division Multiple Access (CDMA) and Digital Advanced Mobile Phone System (D-AMPS) networks, as well as satellite and landline networks.

SMS used signaling paths needed to control network telephony traffic to transport messages during time periods when no signaling traffic existed. In that way, unused network resources could be used to transport messages without additional cost. To fit into existing signaling formats, the length of an SMS message was limited to 128 bytes, or in newer networks, 140 or 160 7-bit characters. Hence the name "SHORT Message Service". A longer message could be sent by a segmentation mechanism, if that enhancement was implemented by a network operator.

LCS support had not been a part of SMS, which has been adopted recently for content delivery and entertainment services, e.g., television (TV) voting. Use of SMS in combination with various location-based services (LBS) applications, such as location-based mobile advertising, has also been tried out in the wireless market, e.g., for delivering discounts to mobile subscribers near advertising restaurants or cinemas.

Positioning information has also been used by emergency-call routing entities to route calls to the appropriate PSAPs with minimum delay, as described for example in Request for Comment (RFC) 5012, Requirements for Emergency Context Resolution with Internet Technologies, Internet Engineering Task Force (IETF), January 2008.

Enhanced Messaging Service (EMS)

The EMS has been standardized by the 3GPP based on the conventional SMS, but includes formatting information that enables messages to contain animations, pictures, melodies, formatted text, vCard, vCalendar, and WVG objects. Objects can be mixed together in one message.

SMS/EMS in 3GPP

In the 3GPP specifications, SMS is specified for Public Land Mobile Networks (PLMN) for transferring short messages between a mobile station (MS), and a Short Message Entity (SME) via a Service Center (SC) in a GSM network or Universal Mobile Telephone System (UMTS) network, for example. The SME is an entity that can send or receive short messages, and the SC serves as an interworking and relaying function of the message transfer between the MS and the SME. SMS also supports the interchange of short messages between MS and e-mail servers, which involves e-mail-to-SMS gateways.

3GPP Technical Specification (TS) 23.040 specifies point-to-point and cell broadcast SMS and EMS. Cell broadcast, which is further specified in 3GPP TS 23.041, enables a text or binary message to be defined and distributed to all MSs connected to a set of cells. Cell Broadcast Entities (CBEs) are connected to a Cell Broadcast Center (CBC), and cell broadcast messages are sent from the CBC to the cells, in accordance with the CBC's coverage requirements. Advanced network infrastructures, such as LTE, can use geographic information system (GIS)-based interfaces for definition of the cell broadcast areas.

Two SMS solutions currently are available in an LTE network: SMS over Internet Protocol (IP), which has been fully specified since Release 7; and SMS over an SGs interface, which is specified in 3GPP TS 23.272, among other specifications.

Figure 3:
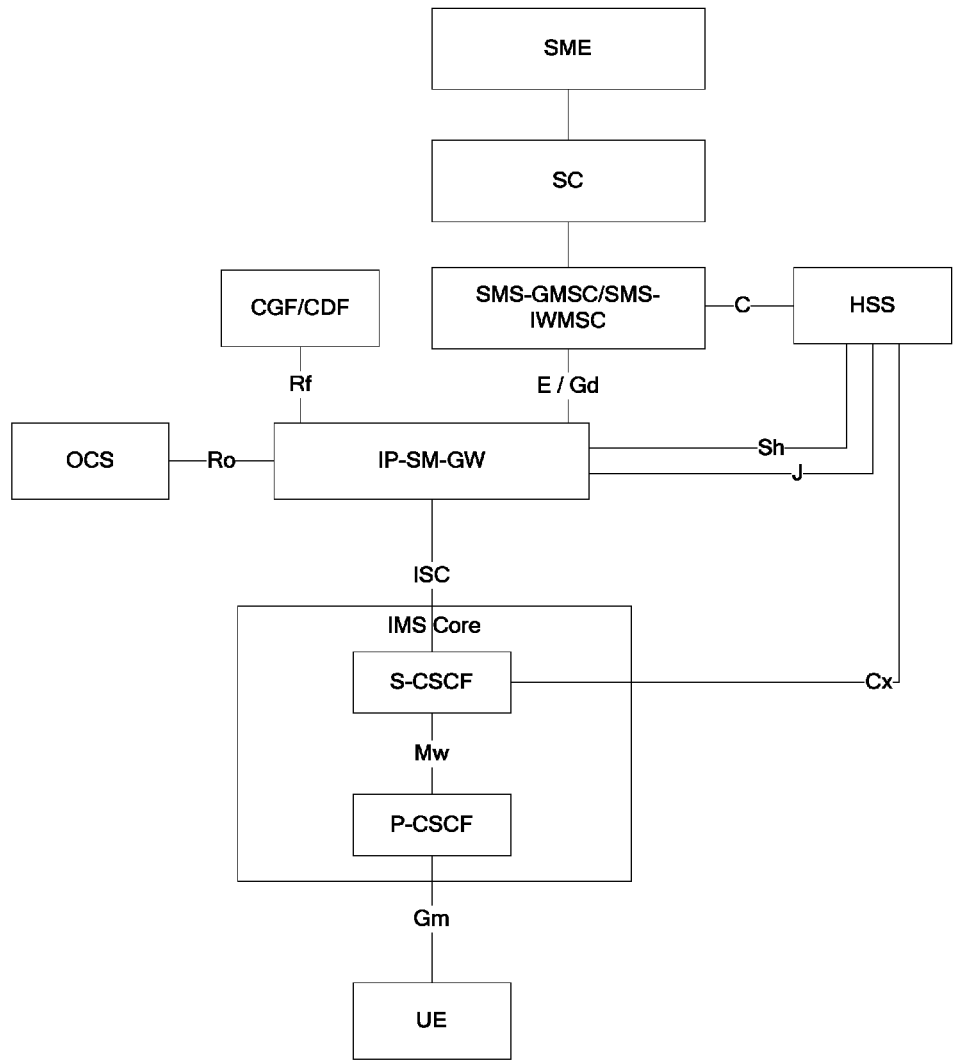
FIG. 3 illustrates a Short Message Service (SMS) over a generic internet protocol connectivity access network.

FIG. 3 is a diagram illustrating SMS over a generic IP connectivity access network (CAN), which is described in Section 5 of 3GPP TS 23.204 V10.2.0, Support of Short Message Service (SMS) over Generic Internet Protocol (IP) Access, Stage 2 (Release 10) (September 2009).

Figure 4:
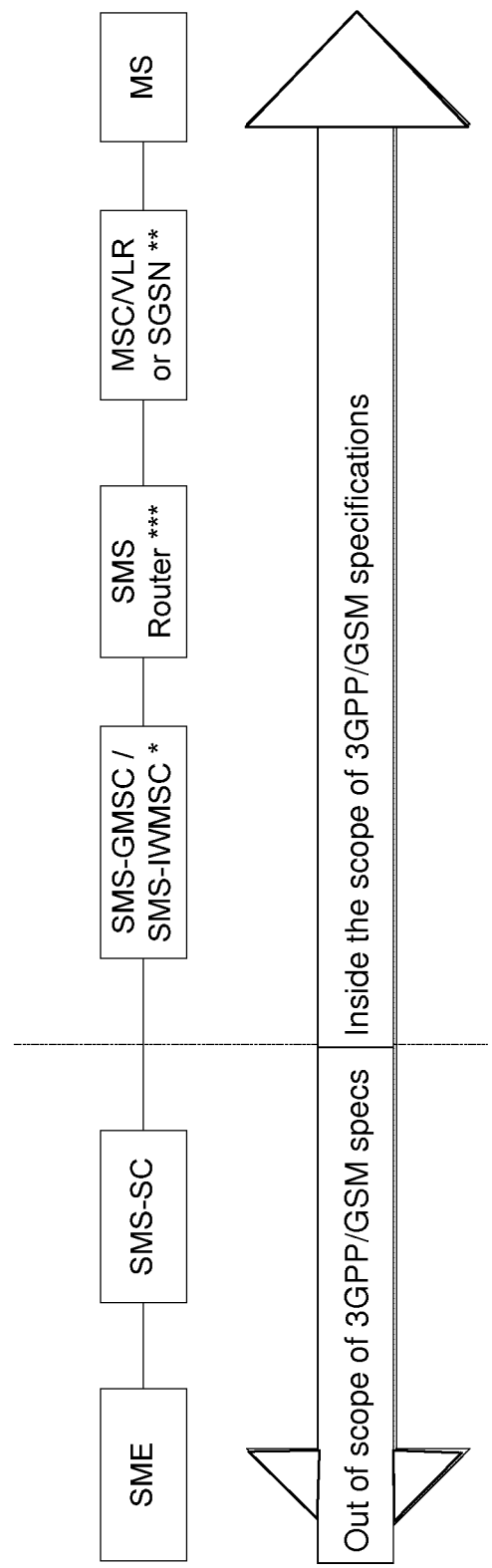
FIG. 4 illustrates SMS over SGs.

FIG. 4 is a diagram illustrating SMS over SGs, which is described in Section 4 of 3GPP TS 23.040 V8.6.0, Technical Realization of the Short Message Service (SMS) (Release 8) (September 2009). SMS over SGs is based on a connectionless SGs reference point between the MME and a Mobile Services Switching Center (MSC) server and non-access stratum (NAS) signaling between the UE and the MME. The arrangement depicted in FIG. 4 includes either an SMS-GMSC, when the short message is transferred from the SC to the MS, or an SMS-IWMSC, when the short message is transferred from the MS to the SC. The SC can be integrated with the SMS-GMSC/SMS-IWMSC. In addition, a Serving GPRS Support Node (SGSN) is used in place of the MSC for SMS transfer over the General Packet Radio System (GPRS). Also, the SMS Router is an optional functional entity, and is used only in the MT case.

SMS over SGs is a transitional solution specified in 3PP Release 8 for those networks that do not support the IP Multimedia Subsystem (IMS). SMS over IP depends on IMS and provides compatibility between legacy cellular communication networks, such as GSM and CDMA networks, and newer networks with more elaborate messaging capabilities via SMS and IMS interworking. SMS over SGs is a hybrid approach that enables transmission of native SMS messages from the circuit-switched (CS) network infrastructure over an LTE radio access network, and thus requires the CS domain infrastructure for the SMS transmission.

There also exist third-party solutions extending services over a generic IP access network, e.g., Voice over LTE via Generic Access (VoLGA), which is directed to connecting already existing MSCs to an LTE network via a gateway. VoLGA hopes to allow reuse of existing second generation (2G) and 3G CS network equipment for enabling CS-based services (e.g., CS voice calls and SMS) without a fallback to the CS network. Nevertheless, VoLGA implies that user equipments (UEs), or MS, are dual-mode, i.e., equipped with GSM/UMTS and LTE interfaces.

SMS Service Elements

The SMS comprises eight service elements particular to the submission and reception of messages:

1. Validity-Period—indicates the time period for which the short message is valid, i.e., for how long the SC shall guarantee its existence in the SC memory before delivery to the recipient has been carried out;

2. SC-Time-Stamp—the time of arrival of the short message at the SC

3. Protocol-Identifier—either a reference to a higher layer protocol being used, or interworking with a certain type of telematic device;

4. More-Messages-to-Send—set to TRUE when there is one or more messages waiting in that SC;

5. Priority—provided by an SC or SME to indicate to the PLMN whether a message is a priority message; delivery of a priority message shall be attempted irrespective of whether or not the MS has been identified as temporarily absent, or having no free memory capacity;

6. Messages-Waiting—in case of previous unsuccessful delivery attempt(s) due to a temporarily absent MS or a MS whose memory capacity is exceeded; this element enables the PLMN to provide the Home Location Register (HLR), Serving General Packet Radio Support Node (SGSN), and Visitor Location Register (VLR) with which the recipient MS is associated with the information that there is a message in the originating SC waiting to be delivered to the MS;

7. Alert-SC—may be provided by some GSM/UMTS PLMNs to inform the SC that an MS is again ready to receive one or more short messages so that the SC may—on reception of an Alert SC—initiate the delivery attempt procedure for the queued messages destined for this MS;

8. MT-Correlation-ID—used to verify from where a received message originated; used only when the home PLMN (HPLMN) of the receiving MS is using an SMS Router or an IP SM Gateway (IP-SM-GW).

SMS Types

Two types of point-to-point SMS are generally defined: Mobile-originating Short Message (MO-SM) service, and Mobile-terminating SM (MT-SM) service. A MO-SM is transported from a MS to a SM SC. A MT-SM is transported from an SM SC to a MS. The SM SC is able to send only one MT-SM to a subscriber address at a time. The MS is able to receive one MT-SM and send one MO-SM at a time.

Figure 5:
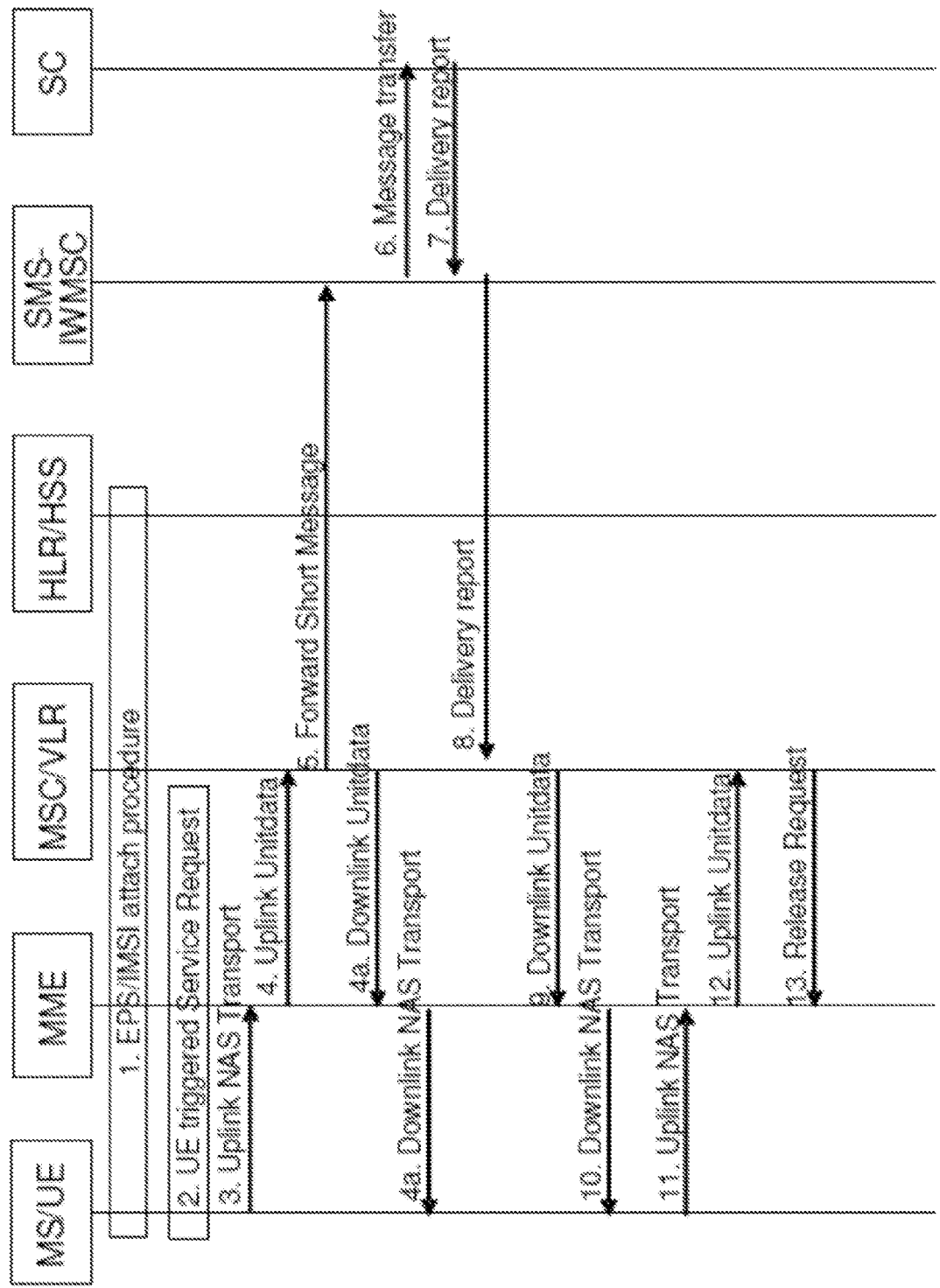
FIG. 5 depicts network entities and messaging in mobile-originated short messaging.

FIG. 5 depicts network entities involved in MO-SM and the message flow among them according to FIG. 8.2.2-1 of 3GPP TS 23.272 V8.8.0. Those network entities include a UE or MS, an MME, an MSC/VLR, a Home Location Register/Home Subscriber System (HLR/HSS), an SMS Interworking MSC (SMS-IWMSC), and the SC. In FIG. 5, the first step is the combined EPS/IMSI (Evolved Packet System/International Mobile Subscriber Identity) attach request, which is also used to inform the network that the UE is capable and configured to use CS fallback and/or SMS over SGs. For SMS but not for CS fallback, the UE must include an "SMS-only" indication in this request. The SMS message is built by the UE as defined in 3GPP TS 23.040 (i.e., the SMS message includes CP-DATA/RP-DATA/TPDU/SMS-SUBMIT parts). Following activation of the Radio Bearers, the SMS message is encapsulated in a NAS message and sent to the MME. Step 2 in FIG. 5 is used only in IDLE mode of the MS/UE, and the SMS-IWMSC is a functionality of an MSC for receiving a short message from within the PLMN and submitting it to the recipient SC.

Figure 6:
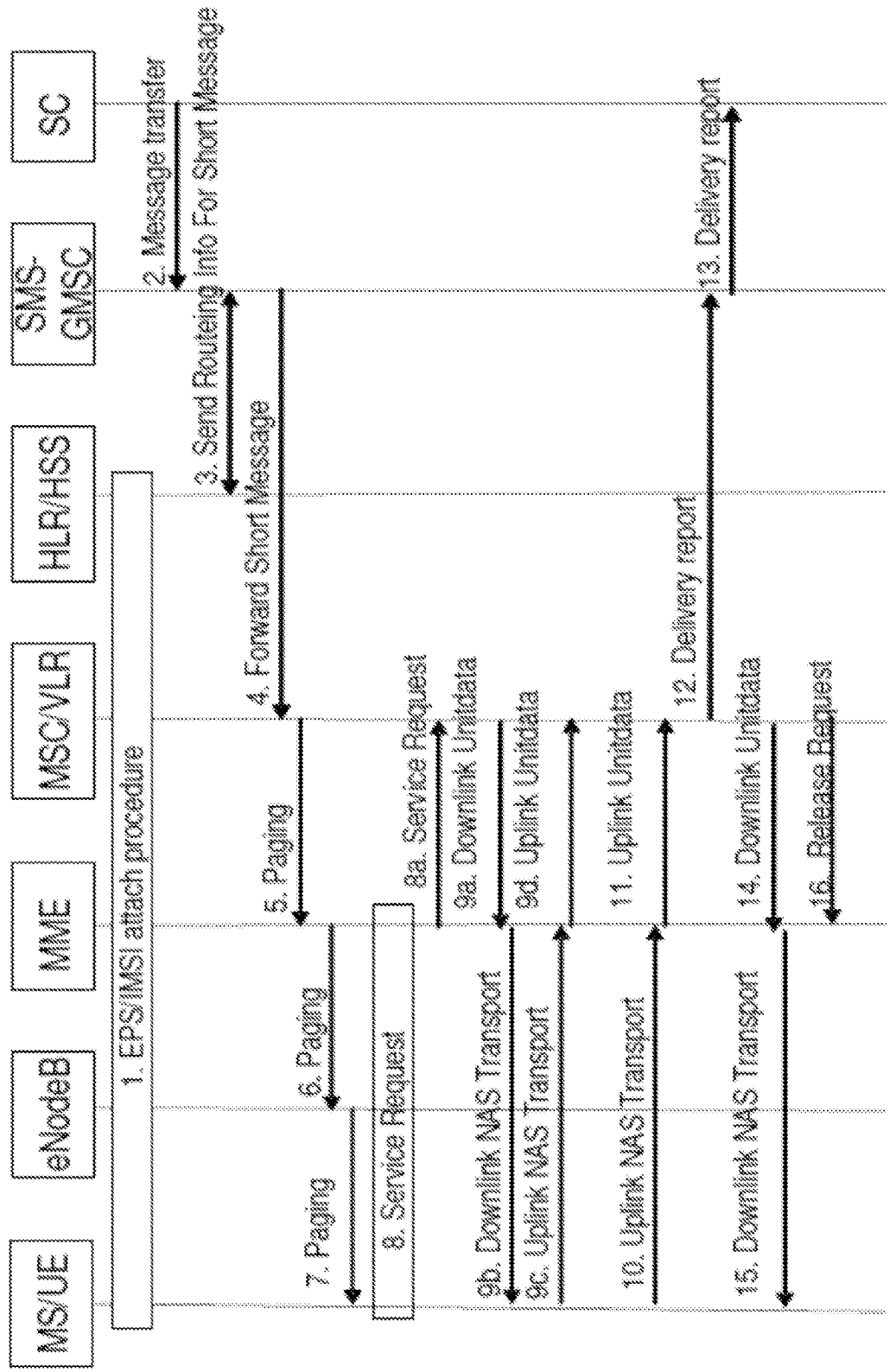
FIG. 6 depicts network entities and messaging in mobile-terminated short messaging.

FIG. 6 depicts network entities involved in MT-SM and the message flow among them according to FIG. 8.2.4-1 of 3GPP TS 23.272 V8.8.0. Step 5 is used only in IDLE mode, and the SMS-GMSC is the Gateway MSC for SMS (a function of an MSC capable of receiving a short message from an SC, interrogating an HLR for routing information and SMS info, and delivering the short message to the visited MSC or the SGSN of the recipient MS). In FIG. 4, the SC initiates transfer of mobile terminating SMS. The HLR is requested for routing number for SMS services and the SMS message is forwarded to the MSC/VLR where the MS/UE is CS attached. The MSC/VLR sends a Paging (IMSI, VLR TMSI, Location Information, SMS indicator) message to the MME, which in turn initiates the paging procedure by sending the Paging message to each eNodeB with cells belonging to the tracking area(s) in which the UE is registered. The MSC/VLR builds the SMS message to be sent as defined in 3GPP TS 23.040 (i.e., the SMS message includes CP DATA/RP DATA/TPDU/SMS DELIVER parts) and forwards it to the MME, which then encapsulates the SMS message in a NAS message and sends the message to the MS/UE.

Positioning Procedures in LTE Networks

Figure 2B:
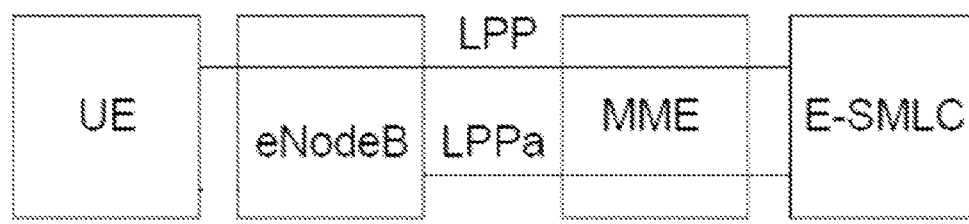
FIGS. 2B, 2C depict control-plane and user-plane architectures of the communication network.
Figure 2A:
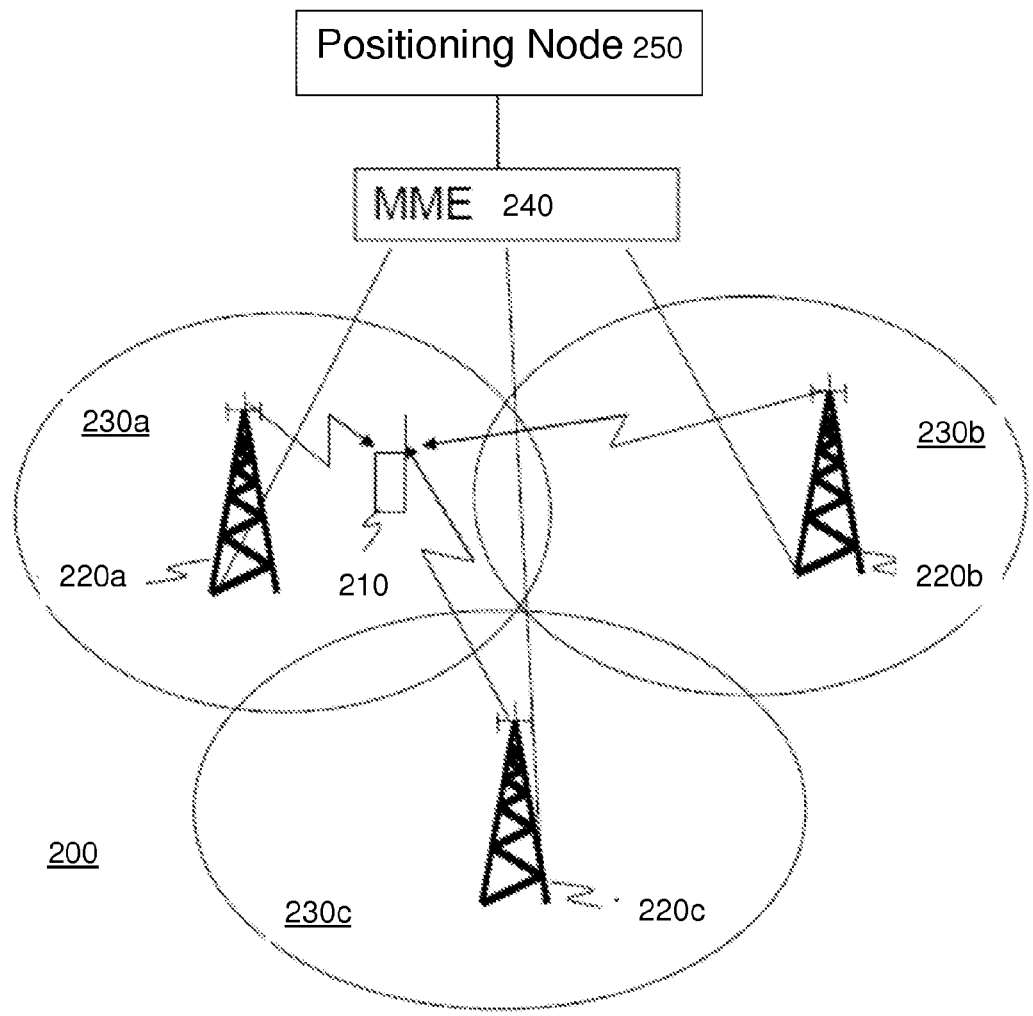
FIG. 2A depicts a communication network.
Figure 2C:
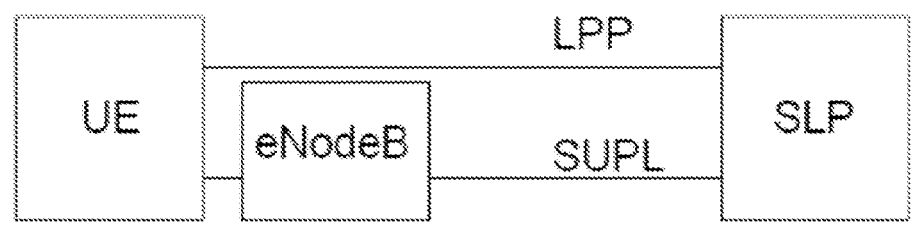

In LTE, UMTS, and GSM communication networks, such as that depicted in FIG. 2, positioning message flows are specified for a network-induced location request (NI-LRs), mobile-terminated location request (MT-LR), and mobile-originated location request (MO-LR) by 3GPP TS 23.271 V10.0.0, for example. The specification also defines flows for emergency calls, which can differ from the corresponding general flows for the same request type.

Figure 7:
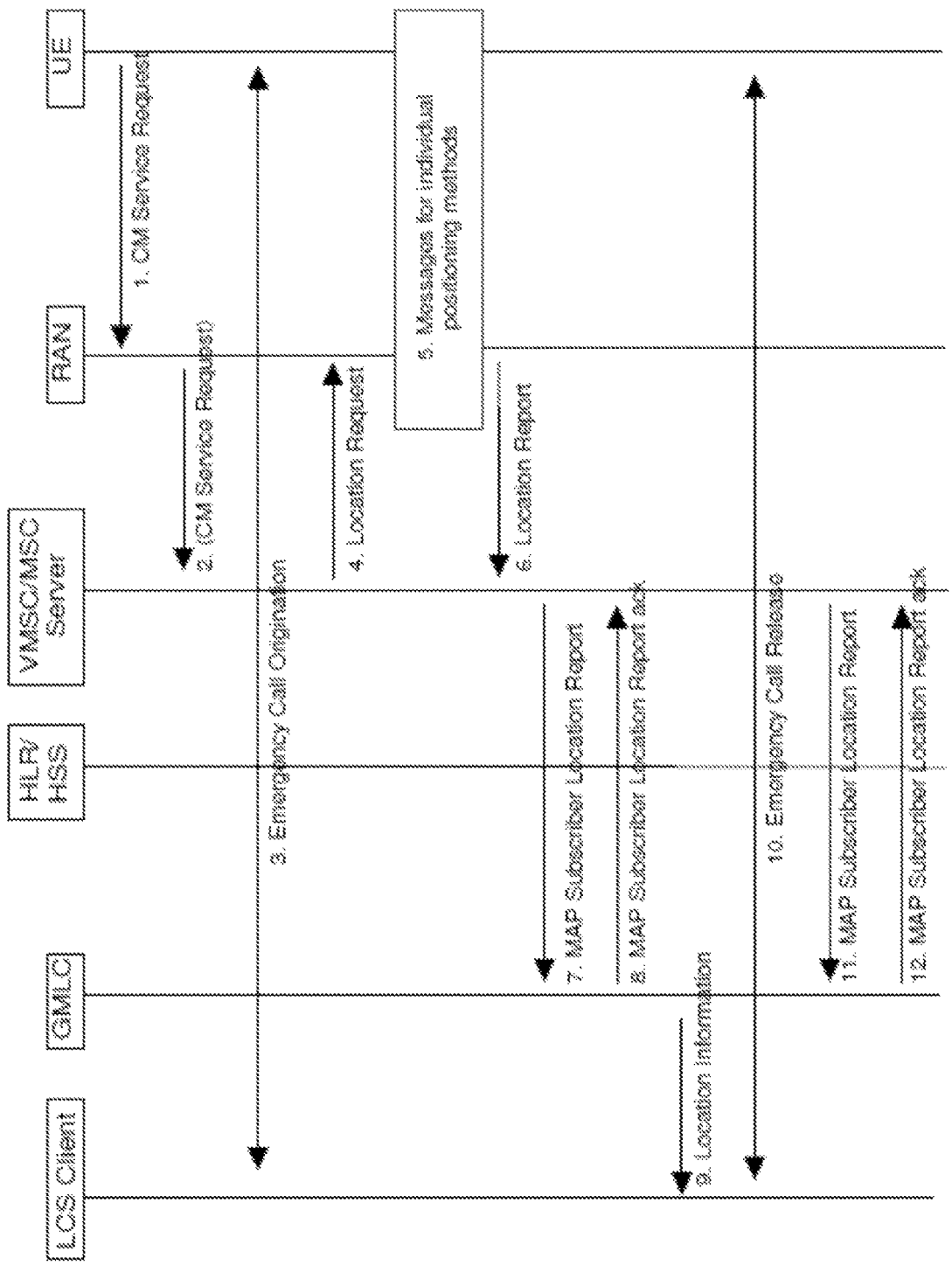
FIG. 7 depicts a network-induced location request message flow in a positioning method for an emergency call.

FIG. 7 depicts the NI-LR message flow used to obtain a positioning result for a UE at the beginning of an emergency call. The MSC in the core network detects an emergency services flag that is set by the UE and forwarded by the RAN (e.g., an eNodeB). The MSC then sends a positioning request to the RAN with a specified Quality of Service (QoS). The RAN acts upon the positioning request, and passes the responsive positioning result back to the MSC, which forwards the UE positioning information to the GMLC. The GMLC signals the UE positioning result to the LCS client, which in this example is an Emergency Center or PSAP.

An LCS Client (which can also be a PSAP in the case of emergency service) or a UE can receive the positioning result from different sources, e.g.:

Positioning node (e.g., E-SMLC or SLP in LTE, RNC in WCDMA, etc.) when position calculation is at the network side;

MME/VMSC/MSC and GMLC (the nodes that do not calculate the position, but receive the information from other nodes);

Another UE, e.g. with a possibility of device-to-device communication (for example, with SUPL);

other nodes such as radio nodes (e.g. eNodeB, relays, etc.) and serving GW, depending on where the LCS Client resides and whether the positioning response goes over the control plane or the user plane; typically these nodes just transmit the positioning information further on to other nodes.

Graphical Formats for Text-Based Messaging

Scalable Vector Graphics (SVG) Format

SVG has features and syntax of a modularized language for describing two-dimensional vector and mixed vector/raster graphics in XML. Version 1.1 of the SVG specification is published by the World Wide Web Consortium (W3C), and is described at www.w3.org/TR/SVG11/. The described two-dimensional vector graphics can be static and dynamic (i.e., interactive or animated). The SVG specification is an open standard that has been under development since 1999.

SVG allows three types of graphic objects: vector graphics, raster graphics (including PNG and JPEG raster images), and text. SVG also has two mobile-network profiles: SVG Tiny (SVGT) and SVG Basic (SVGB), although SVG is not limited to mobile network applications. SVGT and SVGB are subsets of the full SVG standard that are intended for mobile devices having limited capabilities. In particular, SVGT was defined for highly limited mobile devices, such as cell phones, and SVGB was defined for more capable mobile devices, such as smart phones and personal digital assistants (PDAs).

Since 2003, the 3GPP adopted SVGT as the vector graphics media format required for phones, and made support of SVGB optional for Multimedia Messaging Service (MMS), as described in 3GPP TS 26.140, and Packet Switch Stream (PSS), as described in 3GPP TS 26.234. SVGB has since been made the required format for vector graphics in the IMS, as described in 3GPP TS 26.141. Today, many mobile devices support SVG (at least SVGT), including mobile phones made by Sony Ericsson, Nokia, Motorola, Siemens, Samsung, and LG, and most PDAs, laptop computers, etc. The format is also commonly used by nearly all modern web browsers.

The SVG 1.1 specification defines fourteen important functional areas, or feature sets, in an SVG file, including paths, basic shapes, and text. Paths are simple or compound shape outlines drawn with curved or straight lines that can be filled in or outlined (or used as a clipping path), are expressed in a highly compact coding, and can represent various Bezier and elliptical curves. Basic shapes are straight-line paths or paths made up of a series of connected straight-line segments (polylines), including closed polygons, circles, ellipses, rectangles, and round-cornered "rectangles" as standard elements. Text is unicode character text expressed as XML character data.

Positioning information in a graphical format such as SVG and WVG can be presented as information in a text-encoded graphical format. For example, XML can be used to represent different SVG objects, and XML is also commonly used in web and Java programming, for example.

Wireless Vector Graphics (WVG) Format

WVG is a vector graphics format used for representing vector graphics pictures or animations that is scalable, as described in 3GPP TS 23.040 V9.2.0 (2010-03), for example. WVG is used in EMS messaging, which is based on standard SMS, but with formatting added to the text. The formatting permits a message to contain any mix of animations, pictures, melodies, formatted text, and vCard and vCalendar objects.

WVG objects have two types: Standard Size and Character Size. The actual size on a visual display of a Standard Size WVG object depends on the display size and on the particular man-machine interface (MMI) used. The size of a Character Size WVG object has a height that equals or is similar to the height of text character but with a variable width. A Character Size WVG object can also be edited in the same way as standard text, e.g., with insertion, deletion, and text wrapping.

As described in Annex G.2 of 3GPP TS 23.040, WVG uses the following graphical primitives that can be used to describe a compact drawing: Lines, Polygons, Simple Shapes, Special Shapes, and Text. Other possible primitives include Groups, Reuse elements, Animations, Frames, Local elements, and Extended elements (for creating objects that are not a part of the basic set of elements).

Line elements include Polylines, Circular Polylines, and Bezier Polylines. A Polyline is a set of straight line segments connecting a sequence of points. A Circular Polyline is a line that contains at least one circular curve segment that connects two points by a circular arc. The curve segment is determined by the two points and a curve offset, which is the perpendicular distance from the center of a straight line segment connecting the points to the circular arc. A Bezier Polyline contains one or more off-curve control points in between on-curve points.

Polygon elements are closed representations of Polyline, Circular Polyline, and Bezier Polyline elements. Simple Shape elements are rectangles and ellipses. A simple shape is defined by a width, a height, a center point, and an angle of rotation. The angle of rotation parameter defines how much the shape should be rotated about its center point from a horizontal axis drawn through its center. Special Shape elements include Regular Polygons, Stars, and Grids.

The WVG objects that typically describe shapes useful for positioning information are Polylines, Polygons, and Ellipses. For example, a circular Polyline can be used to represent an arc. The following are pseudocode WVG object definitions:

Polyline Element

```
<polyline element> ::= [ <numberOfPoints> ] <First Point> {
<Next Point> } [ <point terminator> ]
    ; specifies a start point, zero or many intermediate points
and an end point.
    ; <numberOfPoints> appears only when in flat coordinate
mode
    ; <point terminator> appears only when in compact
coordinate mode
```

Circular Polyline Element

```
<circular polyline element> ::= <curve hint> [ <numberOfPoints>
] <FirstPoint> <curve offset> <point> { <curve offset>
<NextPoint> } [ <offset terminator> ]
    ; <numberOfPoints> appears only when use
    ; flat coordinate mode
    ; <offset terminator> appears only when use
    ; compact coordinate mode
<curve hint> ::= <hint>
<curve offset> ::= ( 0 | (1 <curve offset value>) ) ; when
<curve hint> is true
    |      <curve offset value>      ; when <curve hint> is
false
<offset value> ::= 'signed 4-bit integer'      ; when <curve
offset in bits> = 0
                ; or in character size WVG
    |      'signed 5-bit integer'      ; when <curve
offset in bits> = 1
    ; Curve offset ratio r = e/L
    ; Where e is actual curve offset(can be positive or
negative),
    ; L is distance between adjacent nodes
    ; We use a signed integer value v to represent. v =
round(r*k);
    ; Where k = 2^n – 2 (n is number of bits used for <offset
value>)
```

Polygon Element

```
Polygon element is actually a closed polyline (including
circular and Bezier polyline)
<polygon element> ::= ( 00 <polyline element> ) | (01 <circular
polyline element> )
  | (10 <Bezier polyline element> )
```

Simple Shape Element—Ellipse

```
<ellipse element>::=<Point><Width><Height> <Angle>
<Width> ::= <X> | <Offset X>
    ; <Offset X> is used when <Offset Bit Use> exists in the
<basic element header>
    ; if the element is in global scope in compact coordinate
mode, use unit of
    ; (global envelope width/ (number of X grid lines −1 ))
<Height>::= 0 | (1 <HeightValue> ) ; 0 means the height is same
as width, height will not be encoded
```

```
<HeightValue> ::= <Y> | <Offset Y>
    ; <Offset Y> is used when <Offset Bit Use> exists in the
    <basic element header>
    ; if the element is in global scope in compact coordinate
    mode, use unit of
    ; (global envelope height/ (number of Y grid lines –1 ))
```

Signaling Positioning Information Using a Graphical or Text-Encoded Graphical Format In accordance with aspects of this invention, positioning information, which can include positioning uncertainty information and which can include a reference position, is encoded according to a graphical format or a text-encoded graphical format and signaled in a message. The graphical format is preferably SVG or WVG, and the text-encoded graphical format is preferably an XML-based encoding of SVG or WVG. The location information is preferably signaled by a messaging service, e.g., SMS, EMS, MMS, general text messaging, etc. At least one graphical object or text-encoded graphical object describing the positioning information, optionally including the positioning uncertainty information, is included in the message.

For example, the at least one graphical object describing the positioning information can be included as text directly in the body of the message. For another example, the at least one graphical object can be included in the message as a set of separate graphical objects, e.g., separate graphical objects for the positioning result and the uncertainty information, or separate graphical objects for different components of a hybrid positioning result (e.g., a polygon and an arc), or as a separate combined graphical object in the message.

The inventors have recognized that the typically limited resolution of a display that can be used to view positioning information in a message can limit the accuracy of a position plotted on the display, especially when the geographic region presented on the display is large, e.g., a city, county, state, country, etc. That limitation can be overcome, if desired, by complementing graphics-encoded positioning information with information identifying a suitable "absolute" reference point, e.g., the center point or a corner point of the geographic region. Such an "absolute" reference point can be a point already defined in the GAD shapes (see descriptions in Table 1) or a point added to such shapes. Such a reference point can be conveniently provided by information on its latitude, longitude, and altitude, according to the WGS84 system. As an alternative, the information identifying the position of the reference point can be provided as a cell ID (an implicit position) when the cell is small enough. Other reference points can be used, such as the 3GPP GAD shapes (e.g., "ellipsoid point" or "ellipsoid point with altitude") described above. The information identifying the reference point position can be signaled from one node to another either as a part of the graphics-encoded message, e.g., as plain unicode text, or any other encoding. Alternatively, the reference point position information can be signaled in a message separate from the graphics-encoded message, e.g., an already standardized positioning signaling message. Thus, either a message having multiple text-encoded or text-embedded parts can be provided, or multiple text-encoded or text-embedded messages can be provided. Another alternative is to use at least part of a civic address position, e.g., a country, state, county, and city.

Figure 8A:
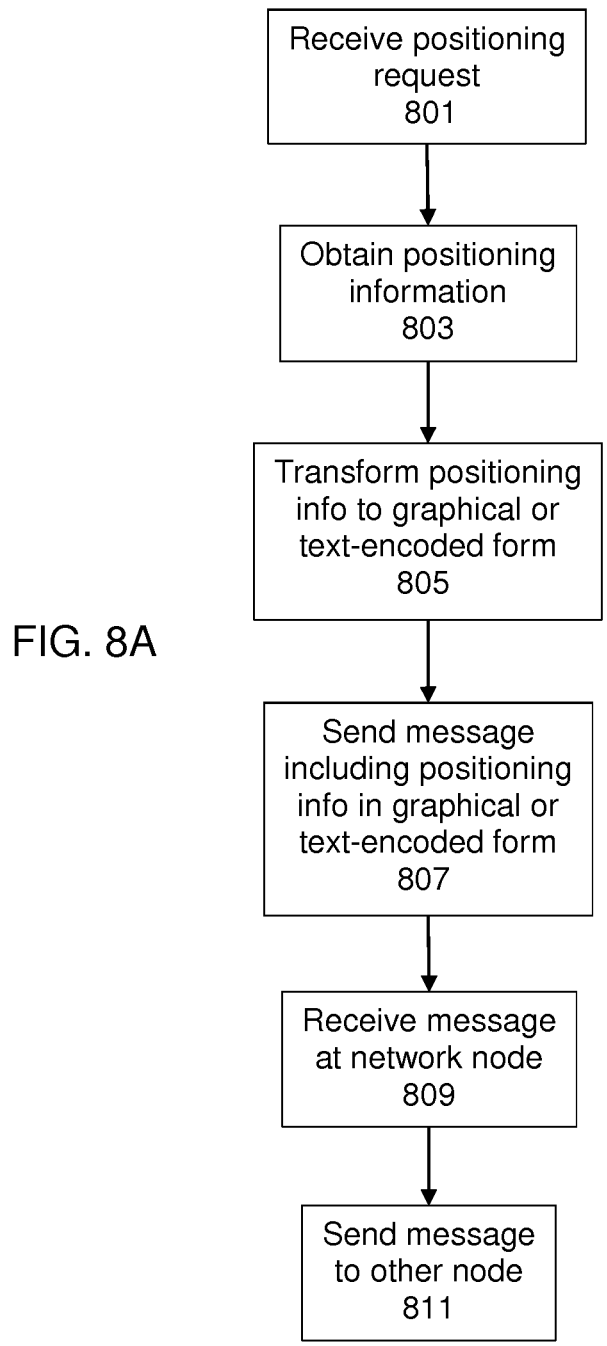

FIG. 8A is a flowchart of an example of a method of handling positioning information in a first node in a communication network in accordance with aspects of this invention. The first node can be at least one of a positioning node, a gateway node, a PSAP, a radio node, and a UE. As depicted in FIG. 8, the method can be initiated by optionally receiving (801) a positioning request by the first node. The method includes obtaining (803) positioning information, which can optionally include position uncertainty information, from a second node in the communication network; transforming (805) the positioning information into a graphical format or a text-encoded graphical format as described above; and sending (807) to a third node or further nodes one or more messages that includes the transformed positioning information, and optionally a reference point position as described above. Sending the message should be understood to include optionally sending the reference position in a separate message, as described above. A further optional step in the method is receiving (809) the text-based message at a third node or further node of the communication network.

The second node that receives the positioning request and/or that obtains the positioning information can be a positioning node as described above, and the third node or further nodes that receives the message containing the transformed positioning information, and the optional reference point position, can be at least one of a PSAP, a UE, a radio node, and a positioning node. The received positioning request (801) can be included in a Messaging Service message, and the positioning request can be a hidden request as described in more detail below, with the positioning request being associated with a non-voice emergency service.

The message that includes the transformed positioning information can be a Messaging Service message, such as an SMS, EMS, and/or MMS message. As described above, transforming (805) positioning information can include encoding the positioning information according to a graphical format, which can include a set of graphical objects, with one or more objects representing the position uncertainty information. For example, the graphical format can include a vector graphics format, such as the SVG and WVG. Transforming positioning information can include encoding a graphical format as a text-based graphical format, e.g., an XML-based format.

Moreover, the third node that receives the text-based message can be a UE, and the method can optionally further include sending (811) the text-based message to a fourth, fifth, or further node, such as another UE. As described above, the communication network can be at least one of a GSM, UMTS, cdma2000, LTE, LTE-Advanced, WiMAX, and WiFi network. Embodiments of this invention are advantageously independent of the RAT of the communication network and independent of protocols currently used for positioning.

In accordance with aspects of this invention, positioning information can be communicated between many nodes or devices in a communication network, e.g., between an end user (e.g., a UE) and an LCS Client (e.g., a PSAP or a commercial service node); between a PSAP and PSAP agents; between a gateway node (e.g., an SMS gateway, an SMS routing node, a general-purpose gateway or routing node, a small-area gateway, etc.) and an end user; between a gateway node and an LCS Client; between a positioning node and an LCS Client; between a positioning node and a MSE (e.g., a PSAP or a commercial service node); between two LCS clients (e.g., a voice-based emergency PSAP and a non-voice based PSAP); between an LCS Client and a MSE; and/or between UEs.

Hidden Positioning Request

In the prior methods and networks, an explicit positioning request can be MO-LR or NI-LR, for which standard procedures exist as described above. A user-plane architecture can trigger positioning upon occurrence of an event related to UE activity, e.g., sending an SMS to a commercial service node, which then sends a positioning request to a SLP. Alternatively, it is also possible to include a SUPL INIT message in an SMS message, which is then used to establish a user-plane positioning session.

Nevertheless, prior methods and networks do not enable a control-plane architecture to trigger positioning upon such events or messages. That control-plane functionality can be crucially important for non-voice emergency services, e.g., when an end user sends an emergency SMS. Moreover, prior methods and networks do not provide for hidden positioning triggers by pre-defined SMS types, which can be useful for both control-plane and user-plane architectures.

In an embodiment of this invention, there is provided a method of handling positioning information in a communication network using a hidden positioning request, such as an SMS or equivalent message sent to the network (NW).

FIG. 8B is a flowchart of a suitable method, which can be recognized as another embodiment of the methods depicted in FIG. 8A. As shown in FIG. 8B, the method includes sending (821) an original message, such as an SMS, EMS, or other message as described above, to the NW by a user. The original message can be of a pre-defined type or can contain a pre-defined tag, e.g., an indicator to a tag known to both the UE and the NW, or a pre-configured tag, e.g., by the user's being subscribed to a certain service.

Based on the original message type or tag, at least one node in the NW associates (823) a pre-defined or pre-configured positioning request with the original message, and the positioning request is sent (825) to a positioning node upon receipt of the original message. For example, the positioning request can be sent by a gateway node or PSAP upon receiving an original emergency message. It should also be understood that the request message that is sent can be different from the original message and that the original message can be sent to another network node, which can then trigger sending a request message.

The positioning node obtains (827) a positioning result responsive to the positioning request, and sends (829) the positioning result (or a failure indication) to another NW node, such as an MME or eNodeB, which receives (831) the positioning result and sends (833), either directly or indirectly, a message that includes the positioning result to at least one of the user and an emergency service agent (e.g., PSAP agents, such as police officers, fire fighters, etc.).

An optional further step in the method depicted in FIG. 8B is displaying (835) the positioning result, and optionally the reference position, on a display device at the user and/or the emergency service agent.

For example, associating (823) the pre-defined or pre-configured positioning request can be implemented either in a node that receives the original user message (e.g., a gateway node or PSAP) or in a node that receives the final message (e.g., a PSAP, in which case the positioning result can be included in another message or the message can be delivered in a format other than the format of the original message). In one embodiment, the associated positioning request includes a requested positioning QoS that is associated with the request and the original message, and in another embodiment, the associated positioning request specifies at least one positioning method, e.g., a preferred method or a set of methods supported by the UE, which can be indicated in a tag of the original message or associated with the original message. In another embodiment, the associated request specifies a preferred positioning result format (e.g., because a set of formats supported by a PSAP can be smaller than a set of formats supported by the positioning node). The positioning request can be associated with the original message by associating a Client Type and/or a Service Type with the original message, and the associating network node can be a PSAP configured for receiving an original emergency message.

In one embodiment, the positioning node can obtain the positioning result to meet a requested or pre-defined positioning QoS, and in another embodiment, the positioning result can be obtained by using at least one of a method indicated in the request and a pre-defined method. In another embodiment, the positioning node sends the positioning result in a requested or a pre-defined format, such as a graphical format, and in another embodiment, at least one of a pre-defined QoS, a pre-defined positioning method, and a pre-defined result format is associated with a Client Type and/or a Service Type associated with the message. In another embodiment, the positioning result is in a civic address format.

In another embodiment, the node that sends (825) the positioning request to the positioning node and the node that receives (831) the positioning result can be different nodes, e.g., a gateway node as sender and a PSAP or commercial service client as receiver. In other embodiments, the nodes in the two steps can be the same nodes, e.g., a PSAP or a gateway node, where the latter can also "host" or communicate with a commercial service client.

It will be understood that the invention as described above can be embodied in a network user plane, a network control plane, and a combination of the them. Embodiments of this invention can provide a commercial service that gives directions in response to user queries, e.g., to a "how do I get to . . . ?" query or a "where am I?" query. In one embodiment, an interface in the UE generates the necessary SMS or other messages for such queries. In another embodiment, a pre-defined set of queries exist for emergency communication.

Another possible commercial safety application of this invention is sending directions to a lost child. In one embodiment, an interface in the UE of the child generates necessary SMS or other messages for such directions to be issued, using the above embodiments, from the network. A copy of at least the transmitted or received messages during this communication can also be sent to the child's parents or other caregiver, in another embodiment of the invention. In some arrangements, therefore, the UE of the parent can receive positioning information, e.g., in response to a predetermined location request, and then send the positioning information to the UE of the child. Thus, the UEs of the parent and child, or the UEs in device-to-device communication described below, can be considered "fourth" and "fifth" nodes. Of course, the description in this application of a node as a "first node", "second node", "third node", "fourth node", "fifth node", etc. is simply for convenience and is not intended to limit the scope of this invention, which can be embodied in many different arrangements of the nodes in a communication network.

Enhanced Device-to-Device Communication

There is currently a very limited support for location services for device-to-device communication. Nevertheless, exchanging text-based messages between devices, such as UEs, is a fundamental service for such devices. Accordingly, the inventors have recognized that this invention can be embodied in methods and apparatus for sending text-based messages with positioning information in graphical format between devices. For example, a parent's device can send a text-based message to a child's device that describes the position of parent, or the other way around.

As described above, positioning results can be included in text-based messages, such as SMS, EMS, and other messages, that can be sent from one device to another device, e.g., from one mobile phone to another mobile phone, as depicted by steps 831, 833 in FIG. 8B. The positioning information is encoded according to a graphical format, e.g., a vector graphics format, such as SVG, WVG, etc. As depicted in FIG. 8A, such encoding can include transforming positioning information using a text description of graphical objects and including the description of the objects in the message either directly as a text, or as a separate combined object or a set of objects (e.g., a separate graphical object for the uncertainty information).

For such an embodiment, at least the receiving device is configured for translating the received positioning information into a human-readable format (e.g., for displaying on a screen as in FIG. 8B) or for extracting the information for further processing.

In another embodiment, a hidden positioning trigger mechanism can be used as described above, in which a positioning request is associated with a transmitted message in device-to-device communication. The node generating the positioning request in device-to-device communication can be any wireless device or a coordinating node or device.

A commercial safety application of the embodiments described above is sending directions to a lost child (or adult). In one embodiment, an interface in the user equipment of the child's adult or other caregiver generates the necessary text-based messages for determinations of the positions of the UEs of the adult and of the child, and messages including movement directions can be sent from the UE of the adult to the UE of the child.

In another embodiment, messages exchanged by UEs can include graphical movement directions that can then be displayed in the UE of the adult. In other embodiments, in this and other parts of this application, it will be understood that the relationship "adult-child" generally means a relationship between any two wireless devices, where the relationship can, for example, be controlled by subscription, be configured in UEs, or be pre-defined according to device roles associated with the service.

Positioning Service by Message Broadcast or Multicast

In other embodiments, handling positioning information as described above can be used for a simple location service, by sending (e.g., in step 829 or 833) a cell broadcast or multicast message aimed at communicating positioning information over all or part of a geographic cell area. The positioning information is preferably encoded in a graphical format (e.g., as described above for device-to-device communication), and the positioning information can include the positioning uncertainty information.

In other embodiments, the broadcast or multicast positioning information can be provided in a civic address format as described above and in U.S. patent application Ser. No. 12/871,984. In further embodiments, the positioning information can result from the positioning approaches described in U.S. patent application Ser. No. 12/871,984 and the civic address can be pre-configured in an RBS.

In other embodiments, the transmission of the broadcast/multicast message containing positioning information can be triggered, directly or indirectly, by a network node configured for coordinating emergency communication (e.g., a PSAP). In further embodiments, transmissions of broadcast/multicast messages containing positioning information can be triggered in more than one RAT, and the triggering node (e.g., a PSAP) can be the same node for those RATs. In other embodiments, the positioning information in a broadcast/multicast message can be obtained without involvement of a positioning node after the request for the positioning information has been triggered. For example, the positioning information can be obtained from a memory or database in or accessed by an RBS or another network node (e.g., a PSAP or an operations and maintenance (O&M) node).

Figure 9:
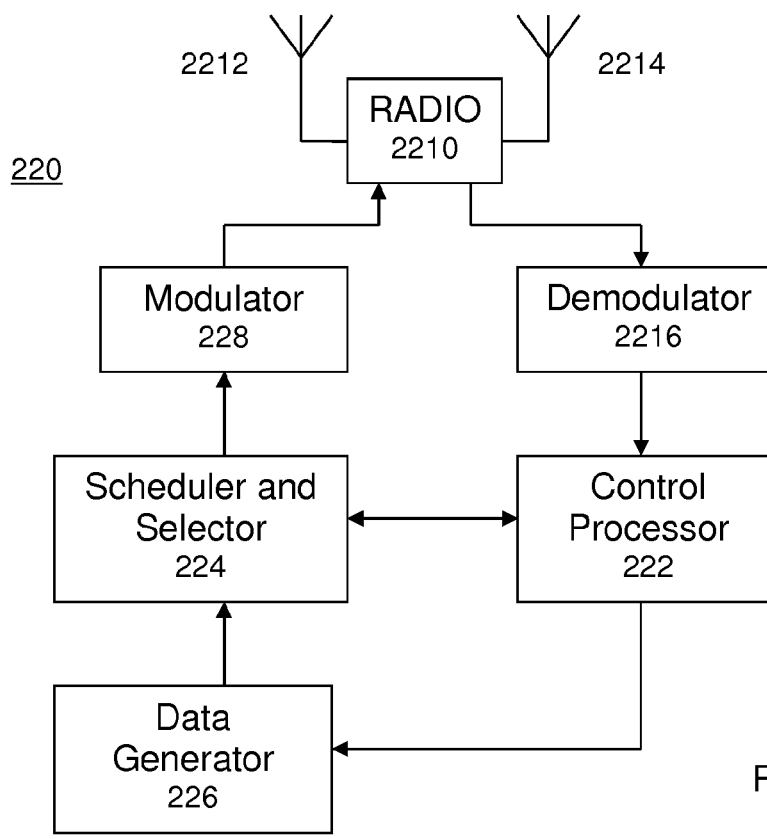
FIG. 9 is a block diagram of a radio network node for handling positioning information in a communication network.

FIG. 9 is a block diagram of a portion of an eNodeB 220*a*, 220*b*, 220*c*, which is typical of RAN nodes in an LTE communication network 200 can communicate with UEs and core network nodes and handle positioning information by implementing the methods described above. Several parts of such a transmitter are known and described for example in Clauses 6.3 and 6.4 of 3GPP TS 36.211. It will be appreciated that the functional blocks depicted in FIG. 9 can be combined and re-arranged in a variety of equivalent ways, and that many of the functions can be performed by one or more suitably programmed digital signal processors and other known electronic circuits. Moreover, connections among and information provided or exchanged by the functional blocks depicted in FIG. 9 can be altered in various ways to enable a device to implement the methods described above and other methods involved in the operation of the device in a digital communication system.

The eNodeB 220 is operated by a control processor 222, which typically and advantageously is a suitably programmed digital signal processor. The control processor 222 typically provides and receives control and other signals from various devices in the eNodeB 220. For simplicity in FIG. 9, the control processor 222 is shown exchanging information with a scheduler and selector 224, which receives digital words to be transmitted to respective UEs or to be broadcast from a suitable data generator 226. The scheduler and selector 224 implements resource block and resource element (RB/RE) scheduling and selection in an LTE system, for example, and implements code allocation, for example, in other communication systems.

The control processor 222 is suitably configured, for example by programming, to implement steps of the methods of handling positioning information described above, including for example receiving text-based and other messages and causing such messages to be generated and sent. The processor 222 is further adapted to handle uncertainty information and confidence information in accordance with the methods described above. In some embodiments, the processor 222 is additionally adapted to transform positioning information from one format to another.

Information from the scheduler and selector 224 is provided to a modulator 228 that uses the information to generate a modulation signal suitable for the particular communication system. For example, the modulator 228 in an LTE system is an orthogonal frequency division multiplex (OFDM) modulator. The modulation signal generated by the modulator 228 is provided to a suitable radio circuit 2210 that generates a wireless signal that is transmitted through at least one transmit antenna 2212. Wireless signals transmitted by UEs are captured by at least one receive antenna 2214 that provides those signals to the radio 2210 and a demodulator 2216. The artisan will understand that the same antenna can be used for transmission and reception, as is often done in a UE.

It will be understood that the control processor 222 can be configured such that it includes one or more other devices depicted in FIG. 9, which can be implemented by dedicated programmed processors or other suitable logic configured to perform their functions. The combination of the data generator 226, scheduler and selector 224, and modulator 228 produces downlink (DL) frames or sub-frames to be transmitted. The modulator 228 converts the information into modulation symbols that are provided to the radio 2210, which impresses the modulation symbols on one or more suitable carrier signals. In an LTE system for example, the radio 2210 impresses the modulation symbols on a number of OFDM subcarriers. The modulated subcarrier signals are transmitted through the antenna 2212.

In an exemplary embodiment the RAN node 220 includes a transceiver that can be included in the radio circuit 2210 and/or the at least one antenna 2212 and/or the at least one antenna 2214 depicted in FIG. 9. The transceiver can be adapted to send original or transformed positioning information and optional uncertainty information, as well as other information to another node in the communication network, such as a UE or a positioning node. The node 220 can also be adapted to receive information from another node in the communication network.

Figure 10:
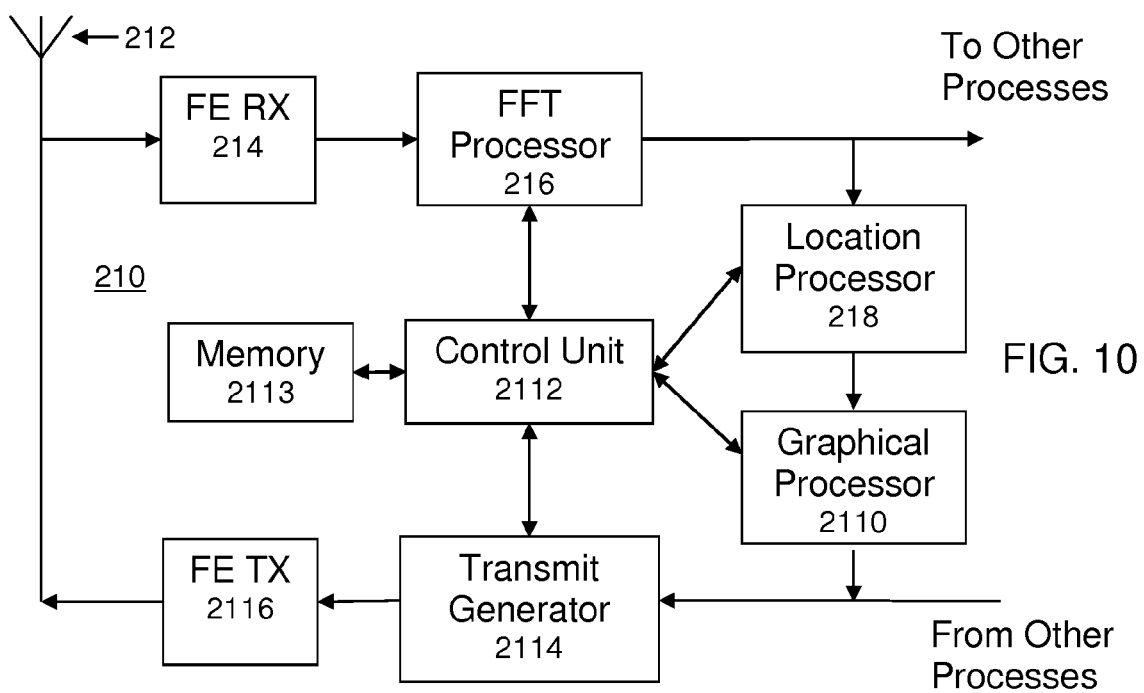
FIG. 10 is a block diagram of a user equipment for handling positioning information in a communication network.

FIG. 10 is a block diagram of an arrangement in a UE 210 that can implement the methods described above. It will be appreciated that the functional blocks depicted in FIG. 10 can be combined and re-arranged in a variety of equivalent ways, and that many of the functions can be performed by one or more suitably programmed digital signal processors. Moreover, connections among and information provided or exchanged by the functional blocks depicted in FIG. 10 can be altered in various ways to enable a UE to implement other methods involved in the operation of the UE.

As depicted in FIG. 10, a UE receives a downlink (DL) radio signal, including for example synchronization signals, cell-specific reference signals (CRS), and positioning reference signals (PRS), through an antenna 212 and typically down-converts the received radio signal to an analog baseband signal in a front end receiver (FE RX) 214. The baseband signal is typically spectrally shaped by one or more suitable filters and converted from analog form to digital form by a suitable analog-to-digital converter (not shown in FIG. 10).

The time-domain received signal generated by the FE RX 214 is provided to a processor 216 that typically includes a programmable processor or circuit that implements an FFT or other suitable algorithm and generates a frequency-domain (spectral) representation of the baseband received signal. The spectral representation is provided to other processes carried out by the UE, including for example, a suitable location processor 218 that is configured to compare the received signal to a locally generated replica of the PRS or another signal known by the UE. As shown, the processor 218 is configured to operate on the received signal in the frequency domain, but it will be understood that the UE 210 can be configured such that the processor operates on the received signal in the time domain. Signals generated by the location processor 218, including for example, positioning information, are provided to a suitable graphical processor 2110 that can be configured to transform positioning information between different formats.

The processors 216, 218, and 2110 communicate with and are controlled by a control unit 2112 that communicates with a memory unit 2113, and are configured to handle PRS signals, positioning information, and text-based and other messages. The control unit 2112 is further configured such that graphical-format positioning information generated by the processor 2110 is provided to a transmit signal generator 2114, which formats the information in a suitable way into messages and an uplink (UL) signal that is provided to a transmitter front-end (FE TX) 2116, which up-converts the signal and transmits the up-converted signal through the antenna 212 to an eNodeB 220.

In particular, the control unit 2112 can arrange for timing and other received-signal measurements by the UE to be signaled to the positioning node (for UE-assisted positioning) or used locally by the UE (e.g., for UE-based positioning). In addition, the control unit 2112 arranges for SMS and other messages, including positioning requests and/or tags described above to be sent and received by the UE 210. The control unit 2112 is suitably configured, for example by programming, to implement steps of the methods of handling positioning information described above. The control unit 2112 is further adapted to handle position uncertainty information and confidence information in accordance with the methods described above. In some embodiments, the control unit 2112 is additionally adapted to transform positioning information from one format to another.

In the arrangement depicted in FIG. 10, the control unit 2112 keeps track of substantially everything needed to configure the processors 216, 218, and 2110, and generator 2114. This can include cell identity (for reference signal extraction and cell-specific scrambling of reference signals). Communication between the processor 216 and control unit 2112 also includes, for example, cyclic prefix configuration. Although the processors 218 and 2110 are depicted in FIG. 10 as separate blocks, it will be appreciated that the control unit 2112 can be configured, e.g., by suitable programming, to handle positioning information and send and receive messages for positioning as described above.

The control unit and other blocks of the UE can be implemented by one or more suitably programmed electronic processors, collections of logic gates, etc. that processes information stored in one or more memories. The stored information can include program instructions and data that enable the control unit to implement the methods described above. It will be appreciated that the control unit typically includes timers, etc. that facilitate its operations.

FIG. 11 is a block diagram of an arrangement in a positioning node 250 that can implement the methods described above. It will be appreciated that the functional blocks depicted in FIG. 11 can be combined and re-arranged in a variety of equivalent ways, and that many of the functions can be performed by one or more suitably programmed digital signal processors. Moreover, connections among and information provided or exchanged by the functional blocks depicted in FIG. 11 can be altered in various ways to enable a positioning node to implement other methods involved in the operation of the positioning node.

In FIG. 11, a processor circuit 252 is suitably configured, for example by programming, to implement steps of the methods of handling positioning information described above, including for example receiving positioning requests and generating and sending positioning information in suitably formatted messages via an input/output (I/O) interface 254 that couples the positioning node 250 to other network nodes. A memory 256 is coupled to the processor 252 and can be used for programming instructions, computations, and other information in support of the operations of the processor. The processor 252 is further adapted to handle uncertainty information and confidence information in accordance with the methods described above. In some embodiments, the processor 222 is additionally adapted to transform positioning information from one format to another.

Embodiments of this invention are currently expected to enjoy one or more of at least the following technical advantages over previous methods and apparatus:

new ways of signaling positioning information;
enhanced emergency communication (e.g., non-voice-based E-911 service);
enhanced positioning service with device-to-device communication;

enhanced signaling of positioning information, including uncertainty information if desired (e.g., avoiding limitations of currently standardized positioning result formats); and enhanced SMS messaging and other popular messaging services.

It will be appreciated that the methods and devices described above can be combined and re-arranged in a variety of equivalent ways, and that the methods can be performed by one or more suitably programmed or configured digital signal processors and other known electronic circuits (e.g., discrete logic gates interconnected to perform a specialized function, or application-specific integrated circuits). Many aspects of this invention are described in terms of sequences of actions that can be performed by, for example, elements of a programmable computer system. UEs embodying this invention include, for example, mobile telephones, pagers, headsets, laptop computers and other mobile terminals, and the like. Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a medium and execute the instructions.

It will be appreciated that procedures described above can be carried out repetitively as necessary, for example, to respond to the time-varying nature of communication channels between transmitters and receivers. In addition, it will be understood that the methods and apparatus described here can be implemented in various system nodes.

To facilitate understanding, many aspects of this invention are described in terms of sequences of actions that can be performed by, for example, elements of a programmable computer system. It will be recognized that various actions could be performed by specialized circuits (e.g., discrete logic gates interconnected to perform a specialized function or application-specific integrated circuits), by program instructions executed by one or more processors, or by a combination of both. Wireless devices implementing embodiments of this invention can be included in, for example, mobile telephones, pagers, headsets, laptop computers and other mobile terminals, base stations, and the like.

Moreover, this invention can additionally be considered to be embodied entirely within any form of computer-readable storage medium having stored therein an appropriate set of instructions for use by or in connection with an instruction-execution system, apparatus, or device, such as a computer-based system, processor-containing system, or other system that can fetch instructions from a storage medium and execute the instructions. As used here, a "computer-readable medium" can be any means that can contain, store, or transport the program for use by or in connection with the instruction-execution system, apparatus, or device. The computer-readable medium can be, for example but not limited to, an electronic, magnetic, optical, electromagnetic, infrared, or semiconductor system, apparatus, or device. More specific examples (a non-exhaustive list) of the computer-readable medium include an electrical connection having one or more wires, a portable computer diskette, a random-access memory (RAM), a read-only memory (ROM), an erasable programmable read-only memory (EPROM or Flash memory), and an optical fiber.

Thus, the invention may be embodied in many forms, not all of which are described above, and all forms are intended as within the scope of the invention. For each of the various aspects of the invention, any such form may be referred to as "logic configured to" perform an action, or alternatively as "logic that" performs an action.

The invention claimed is:

1. A method in a first node in a communication network of handling positioning information, comprising:
    obtaining positioning information from a second node in the communication network;
    transforming the positioning information into at least one of a graphical format and a text-encoded graphical format; and
    sending a message including the transformed positioning information to a third node in the communication network, wherein the transformed positioning information includes position uncertainty information.

2. The method of claim 1, wherein the message also includes information identifying a position of at least one reference point included in a predetermined positioning shape.

3. The method of claim 1, wherein the message also includes at least one of a Short Messaging Service message, an Enhanced Messaging Service message, and a Multimedia Messaging Service message.

4. The method of claim 1, wherein the position uncertainty information is represented by a respective graphical object in a set of graphical objects.

5. The method of claim 1, wherein the graphical format includes at least one of a Scalable Vector Graphics format and a Wireless Vector Graphics format, and the text-encoded graphical format includes a format based on an eXtensible Markup Language.

6. The method of claim 1, wherein the first node is at least one of a positioning node, a gateway node, a Public Safety Answer Point, a radio node, and a user equipment in the communication network.

7. The method of claim 1, wherein the third node is at least one of a positioning node, a radio node, a user equipment, and a Public Safety Answer Point.

8. The method of claim 1, wherein positioning information is obtained in response to a positioning request corresponding to a Messaging Service message received by the first node.

9. The method of claim 8, wherein obtaining the positioning information includes associating a pre-determined positioning request with the Messaging Service message.

10. The method of claim 9, wherein the predetermined positioning request specifies at least one of a quality of service, a format of positioning information responsive to the predetermined positioning request, and at least one method of determining positioning information.

11. The method of claim 10, wherein the positioning information responsive to the predetermined positioning request includes position uncertainty information, and the graphical format includes the position uncertainty information encoded as a respective graphical object in a set of graphical objects.

12. The method of claim 10, wherein the graphical format includes at least one of a Scalable Vector Graphics format and a Wireless Vector Graphics format.

13. The method of claim 9, wherein the predetermined positioning request is determined based on at least one of a Client Type and a Service Type of the Messaging Service message.

14. The method of claim 9, further comprising receiving in a fourth node in the communication network positioning information responsive to the predetermined location request, and sending a message including received positioning information to a fifth node in the communication network.

15. The method of claim 1, wherein the communication network is one of a Global System for Mobile Communications (GSM), a Universal Mobile Telecommunication System (UMTS), and a 3GPP Long Term Evolution (LTE) communication network.

16. The method of claim 15, wherein the positioning information corresponds to the position of a user equipment in the communication network.

17. A first node in a communication network for handling positioning information, comprising:
at least one electronic processor circuit configured for obtaining positioning information from a second node in the communication network; transforming the positioning information into at least one of a graphical format and a text-encoded graphical format; and causing the node to send a message including the transformed positioning information to a third node in the communication network, wherein the transformed positioning information includes position uncertainty information.

18. The first node of claim 17, wherein the at least one electronic processor circuit is configured for including in the message information identifying a position of at least one reference point included in a predetermined positioning shape.

19. The first node of claim 17, wherein the message includes at least one of a Short Messaging Service message, an Enhanced Messaging Service message, and a Multimedia Messaging Service message.

20. The first node of claim 17, wherein the graphical format includes at least one of a Scalable Vector Graphics format and a Wireless Vector Graphics format, and the text-encoded graphical format includes a format based on an eXtensible Markup Language.

21. The first node of claim 17, wherein the node is at least one of a positioning node, a gateway node, a Public Safety Answer Point, a radio node, and a user equipment in the communication network.

22. The first node of claim 17, wherein positioning information is obtained by the node in response to a positioning request included in a Messaging Service message received by the first node.

23. The first node of claim 22, wherein obtaining the positioning information includes associating a pre-determined positioning request with the Messaging Service message.

24. The first node of claim 23, wherein the predetermined positioning request specifies at least one of a quality of service, a format of positioning information responsive to the predetermined positioning request, and at least one method of determining positioning information.

25. The first node of claim 24, wherein the positioning information responsive to the predetermined positioning request includes position uncertainty information, and the graphical format includes the position uncertainty information encoded as a respective graphical object in a set of graphical objects.

26. The first node of claim 24, wherein the graphical format includes at least one of a Scalable Vector Graphics format and a Wireless Vector Graphics format, and the text-encoded graphical format is based on an eXtensible Markup Language.

27. The first node of claim 23, wherein the predetermined positioning request is determined based on at least one of a Client Type and a Service Type of the Messaging Service message.

* * * * *

UNITED STATES PATENT AND TRADEMARK OFFICE
CERTIFICATE OF CORRECTION

PATENT NO. : 9,277,384 B2  
APPLICATION NO. : 13/995439  
DATED : March 1, 2016  
INVENTOR(S) : Siomina et al.

Page 1 of 1

It is certified that error appears in the above-identified patent and that said Letters Patent is hereby corrected as shown below:

On the Title Page, in item (56), under "OTHER PUBLICATIONS", in Column 2, Line 13, delete "Efition)"" and insert -- Edition)" --, therefor.

In the Specification

In Column 4, Line 53, delete "51" and insert -- S1 --, therefor.

In Column 20, Line 28, delete "the them." and insert -- them. --, therefor.

Signed and Sealed this  
Twenty-first Day of June, 2016

Michelle K. Lee  
*Director of the United States Patent and Trademark Office*